(12) United States Patent
Kim et al.

(10) Patent No.: US 10,712,962 B2
(45) Date of Patent: Jul. 14, 2020

(54) MEMORY SYSTEM AND OPERATING METHOD THEREOF

(71) Applicant: SK hynix Inc., Gyeonggi-do (KR)

(72) Inventors: Se-Hyun Kim, Seoul (KR);
Kyung-Hoon Lee, Gyeonggi-do (KR);
Sung-Hun Jeon, Gyeonggi-do (KR);
Jung-Woo Kim, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/183,452

(22) Filed: Nov. 7, 2018

(65) Prior Publication Data

US 2019/0294335 A1    Sep. 26, 2019

(30) Foreign Application Priority Data

Mar. 20, 2018  (KR) .................. 10-2018-0031942

(51) Int. Cl.
*G11C 16/04* (2006.01)
*G06F 3/06* (2006.01)
*G06F 7/14* (2006.01)

(52) U.S. Cl.
CPC ............ *G06F 3/064* (2013.01); *G06F 3/0604* (2013.01); *G06F 3/0679* (2013.01); *G06F 7/14* (2013.01)

(58) Field of Classification Search
CPC ...... G06F 3/064; G06F 3/0604; G06F 3/0679; G06F 7/14
See application file for complete search history.

(56) References Cited

U.S. PATENT DOCUMENTS

| 8,832,507 | B2 | 9/2014 | Post et al. |
| 8,949,504 | B2 * | 2/2015 | Yan ..................... G06F 13/1694 |
| | | | 365/189.03 |
| 8,949,507 | B2 | 2/2015 | Chou et al. |
| 10,180,805 | B2 * | 1/2019 | Lehman ................. G06F 3/064 |
| 10,331,346 | B2 * | 6/2019 | Kim ..................... G06F 3/0604 |
| 10,366,776 | B2 * | 7/2019 | Oh ......................... G11C 29/82 |

FOREIGN PATENT DOCUMENTS

KR         101327693        11/2013

* cited by examiner

*Primary Examiner* — Pho M Luu
(74) *Attorney, Agent, or Firm* — IP & T Group LLP

(57) ABSTRACT

A memory system may include: a memory device including a plurality of dies, each including a plurality planes, each including a plurality of blocks; and a controller suitable for grouping the plurality of memory blocks into a plurality of super blocks, each of which has a designated type corresponding to a condition, the controller may form a set of first super blocks, among the plurality of super blocks, each of which has at least one bad memory block and good memory blocks, and may manage the first super blocks.

20 Claims, 16 Drawing Sheets

E/W CYCLES OF FIRST SUPER :
SUPER BLOCK 0 < SUPER BLOCK N-2 < SUPER BLOCK 2 <
SUPER BLOCK 1 < SUPER BLOCK 4 < SUPER BLOCK 3

E/W CYCLES OF SECOND SUPER BLOCKS :
SUPER BLOCK 8 < SUPER BLOCK 6 < SUPER BLOCK N-1 ...

MEMORY SYSTEM AND OPERATING METHOD THEREOF

CROSS-REFERENCE TO RELATED APPLICATION

This application claims priority under 35 U.S.C. § 119 to Korean Patent Application No. 10-2018-0031942, filed on Mar. 20, 2018, which is incorporated herein by reference in its entirety.

BACKGROUND

1. Field

Various embodiments relate to a memory system, and more particularly, to a memory system including a nonvolatile memory device and an operating method thereof.

2. Discussion of the Related Art

The computer environment paradigm has shifted to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts as compared with a hard disk device. Examples of memory systems having such advantages include universal serial bus (USB) memory devices, memory cards having various interfaces, and solid state drives (SSD).

SUMMARY

Various embodiments are directed to a memory system and an operating method thereof, capable of managing a plurality of memory blocks included in a memory device, by grouping them into a super memory block and recovering at least one super memory block including a first bad block with another super memory block including a second bad block, when the first bad block and the second bad block are in different locations of the memory device.

In an embodiment, a memory system may include: a memory device including a plurality of dies, each including a plurality planes, each including a plurality of blocks; and a controller suitable for grouping the plurality of memory blocks into a plurality of super blocks, each of which has a designated type corresponding to a condition, the controller may form a set of first super blocks, among the plurality of super blocks, each of which has at least one bad memory block and good memory blocks, and may manage the first super blocks.

The controller may use the first super blocks as target super blocks in a merge operation, and the controller may form a set of second super blocks, among the plurality of super blocks, each of which has only good memory blocks, and may manage the second super blocks.

The controller may manage the first super blocks to be used as target super blocks in the merge operation using a target list corresponding to a use sequence, and the use sequence of the target list may be determined based on respective priorities of the super blocks.

The controller may set a first super block having a relatively low erase-write cycle value, among the first super blocks, to a first priority, sets a first super block having a relatively high erase-write cycle value, among the first super blocks, to a second priority lower than the first priority, may set a second super block having a relatively low erase-write cycle value, among the second super blocks, to a third priority lower than the second priority, may set a second super block having a relatively high erase-write cycle value, among the second super blocks, to a fourth priority lower than the third priority, and may use the prioritized super blocks in the use sequence in order of priority.

The controller may manage states of memory blocks in each of the first super blocks using a state bitmap.

In the case where the target super blocks are selected from among the first super blocks according to the use sequence of the target list in the merge operation, the controller may store valid data transferred from a source super block only in good memory blocks of the target super blocks by checking the state bitmap which identifies good memory blocks.

The controller may manage first super blocks which enter into a closed state as they are used as target super blocks in the merge operation and valid data transferred from a source super block are stored therein by classifying them as third super blocks, and in the case of selecting the third super blocks as source super blocks in the merge operation, the controller may first use the second super blocks as target super blocks according to the use sequence of the target list, and then, may manage the third super blocks which enter into a free state as they are used as the source super blocks in the merge operation by classifying them as the first super blocks again.

In the case where a bad memory block is in a certain second super block among the second super blocks, the controller may move valid data stored in the certain second super block, to a target super block, through the merge operation, and then, may manage the certain second super block as a first super block.

A first die of the plurality of dies may be coupled to a first channel, a second die of the plurality of dies may be coupled to a second channel, the plurality of planes in the first die may be coupled to a plurality of first ways which share the first channel, and the plurality of planes in the second die may be coupled to a plurality of second ways which share the second channel.

The controller may group a first block in a first plane of the first die and a second block in a second plane of the first die and groups a third block in a third plane of the second die and a fourth block in a fourth plane of the second die in accordance with the condition, the controller may group a first block in a first plane of the first die and a third block in a third plane of the second die and may group a second block in a second plane of the first die and a fourth block in a fourth plane of the second die in accordance with the condition, or the controller may group a first block in a first plane of the first die, a second block in a second plane of the first die, a third block in a third plane of the second die and a fourth block in a fourth plane of the second die in accordance with the condition.

In an embodiment, a method for operating a memory system including a memory device including a plurality of dies, each including a plurality planes, each including a plurality of blocks, the method may include: grouping the plurality of memory blocks into a plurality of super blocks, each of which has a designated type corresponding to a condition; and forming a set of first super blocks, among the plurality of super blocks, each of which has at least one bad memory block and good memory blocks, and managing the first super blocks.

The method may further include: using the first super blocks as target super blocks in a merge operation; and forming a set of second super blocks, among the plurality of super blocks, each of which has only good memory blocks, and manages the second super blocks.

The method may further include: managing the super blocks to be used as target super blocks in the merge operation using a target list corresponding to a use sequence; and determining the use sequence of the target list based on respective priorities of the super blocks.

The determining may set a first super block having a relatively low erase-write cycle value, among the first super blocks, to a first priority, sets a first super block having a relatively high erase-write cycle value, among the first super blocks, to a second priority lower than the first priority, may set a second super block having a relatively low erase-write cycle value, among the second super blocks, to a third priority lower than the second priority, may set a second super block having a relatively high erase-write cycle value, among the second super blocks, to a fourth priority lower than the third priority, and may use the prioritized super blocks in the use sequence in order of priority.

The method may further include: managing states of memory blocks in each of the first super blocks using a state bitmap.

In the case where the target super blocks are selected from among the first super blocks according to the use sequence of the target list in the merge operation, the first use act may store valid data transferred from a source super block only in good memory blocks of the target super blocks by checking the state bitmap which identifies good memory blocks.

The method may further include: managing first super blocks which enter into a closed state as they are used as target super blocks in the merge operation and valid data transferred from a source super block are stored therein by classifying them as third super blocks; using, in the case of selecting the third super blocks as source super blocks in the merge operation, the second super blocks as target super blocks according to the use sequence of the target list; and managing the third super blocks which enter into an open state as they are used as the source super blocks by classifying them as the first super blocks again.

The method may further include: moving, in the case where a bad memory block is in a certain second super block among the second super blocks, valid data stored in the certain second super block, to a target super block, through the merge operation, and then, managing the certain second super block by classifying it as a first super block.

A first die of the plurality of dies may be coupled to a first channel, a second die of the plurality of dies may be coupled to a second channel, the plurality of planes in the first die may be coupled to a plurality of first ways which share the first channel, and the plurality of planes in the second die may be coupled to a plurality of second ways which share the second channel.

The condition may include grouping a first block in a first plane of the first die and a second block in a second plane of the first die and grouping a third block in a third plane of the second die and a fourth block in a fourth plane of the second die; the condition may include grouping a first block in a first plane of the first die and a third block in a third plane of the second die and grouping a second block in a second plane of the first die and a fourth block in a fourth plane of the second die; or the controller may include grouping a first block in a first plane of the first die, a second block in a second plane of the first die, a third block in a third plane of the second die and a fourth block in a fourth plane of the second die.

In an embodiment, a memory system may include: a memory device including dies, each including planes, each including blocks; and a controller suitable for grouping blocks into a plurality of super blocks in a select scheme, identifying at least one bad memory block in a first super block, among the plurality of super blocks, and searching a second super block, among the plurality of super blocks, to replace the at least one bad memory block in the first super block with a good memory block of the second super block, and forming a regenerated super block table describing replacement in the first super block, the at least one bad memory block and the good memory block used to replace the at least one bad memory block may be located in corresponding planes of different dies.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
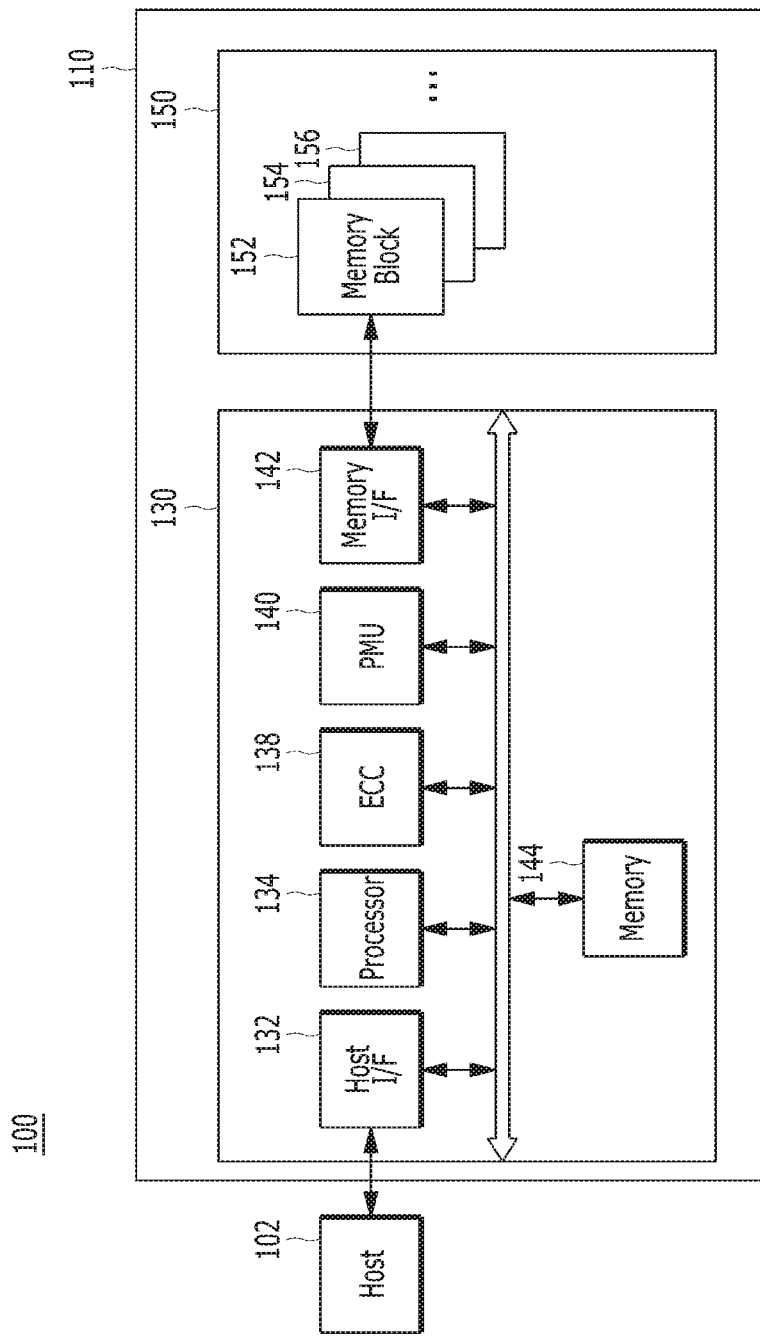
FIG. 1 is a block diagram illustrating a data processing system including a memory system in accordance with an embodiment of the present invention.

Various embodiments of the present invention are described below in more detail with reference to the accompanying drawings. It is noted, however, that elements and features of the present invention may be configured or arranged differently than shown and described herein. Thus, the present invention is not limited to the embodiments set forth herein. Rather, the described embodiments are provided so that this disclosure is thorough and complete and fully conveys the present invention to those skilled in the art to which this invention pertains. Throughout the disclosure, like reference numerals refer to like parts throughout the various figures and embodiments of the present invention. Also, throughout the specification, reference to "an embodiment," "another embodiment," or the like is not necessarily to only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for describing particular embodiments and is not intended to be limiting of the present invention. As used herein, singular forms are intended to include the plural forms and vice versa, unless the context clearly indicates otherwise. It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include any of a variety of portable electronic devices such as a mobile phone, MP3 player and laptop computer or non-portable electronic devices such as a desktop computer, a game machine, a TV and a projector.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by or include any of various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM) and a flash memory. The flash memory may have a 3-dimensioanl (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in any of the various types of memory systems as exemplified above.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation. The memory device 150 may provide data stored therein to the host 102 through a read operation. The memory device 150 may include a plurality of memory dies (not shown), each memory die including a plurality of planes (not shown), each plane including a plurality of memory blocks 152 to 156, which may include a plurality of pages. Each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, an error correction code (ECC) component 138, a Power Management Unit (PMU) 140, a NAND flash controller (NFC) 142 and a memory 144, all operatively coupled, or electrically connected, via an internal bus.

The host interface 132 may be configured to process a command and data of the host 102, and may communicate with the host 102 according to one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC component 138 may detect and correct an error contained in the data read from the memory device 150. In other words, the ECC component 138 may perform an error correction decoding process to the data read from the memory device 150 through an ECC code used during an ECC encoding process. According to a result of the error correction decoding process, the ECC component 138 may output a signal, for example, an error correction success or fail signal. When the number of error bits is more than a threshold value of correctable error bits, the ECC component 138 may not correct the error bits, and may instead output an error correction fail signal.

The ECC component 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component 138 is not limited to these error correction techniques. As such, the ECC component 138 may include all circuits, modules, systems or devices for suitable error correction.

The PMU 140 may manage electrical power used and provided in the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 to process data entered into the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130. The memory 144 may store data supporting operations of the memory system 110 and the controller 130. The controller 130 may control the memory device 150 to perform read, write, program and erase operations in response to a request from the host 102. The controller 130 may provide data read from the memory device 150 to the host 102, and may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 illustrates an example of the memory 144 disposed within the controller 130. In another embodiment, the memory 144 may be an external volatile memory having a memory interface transferring data between the memory 144 and the controller 130.

The processor 134 may control the overall operations of the memory system 110. The processor 134 may use firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block among the plurality of memory blocks 152 to 156 in the memory device 150. The bad block may be where a program fail occurs during a program operation due to the characteristics of a NAND flash memory. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
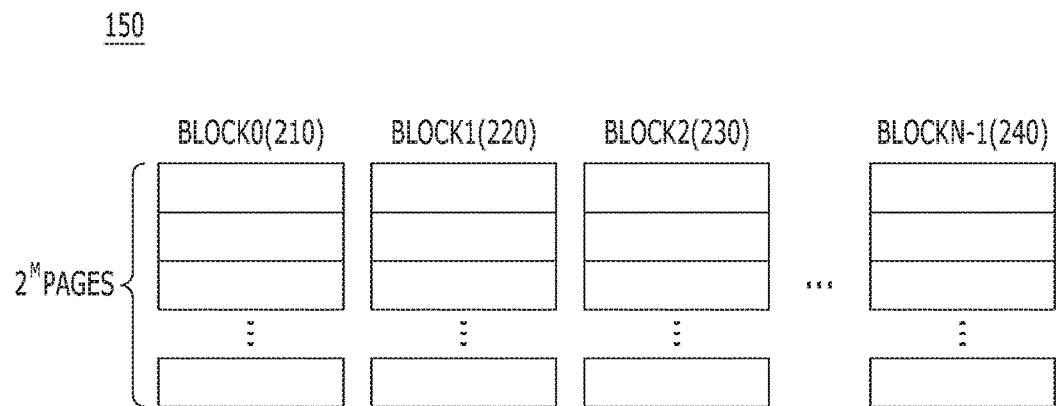
FIG. 2 is a schematic diagram illustrating an exemplary configuration of a memory device employed in the memory system shown in FIG. 1.

FIG. 2 is a schematic diagram illustrating an example of the memory device 150.

Referring to FIG. 2, the memory device 150 may include a plurality of memory blocks: BLOCK0 (210), BLOCK1 (220), BLOCK2 (230) to BLOCKN−1 (240), each of which may include a plurality of pages, for example, $2^M$ pages, the number of which may vary according to circuit design. Memory cells included in the respective memory blocks 0 to N−1 may be one or more of a single level cell (SLC) storing 1-bit data, or a multi-level cell (MLC) storing 2- or more bit data. In an embodiment, the memory device 150 may include a plurality of triple level cells (TLC) each storing 3-bit data. In another embodiment, the memory device may include a plurality of quadruple level cells (QLC) each storing 4-bit level cell.

Figure 3:
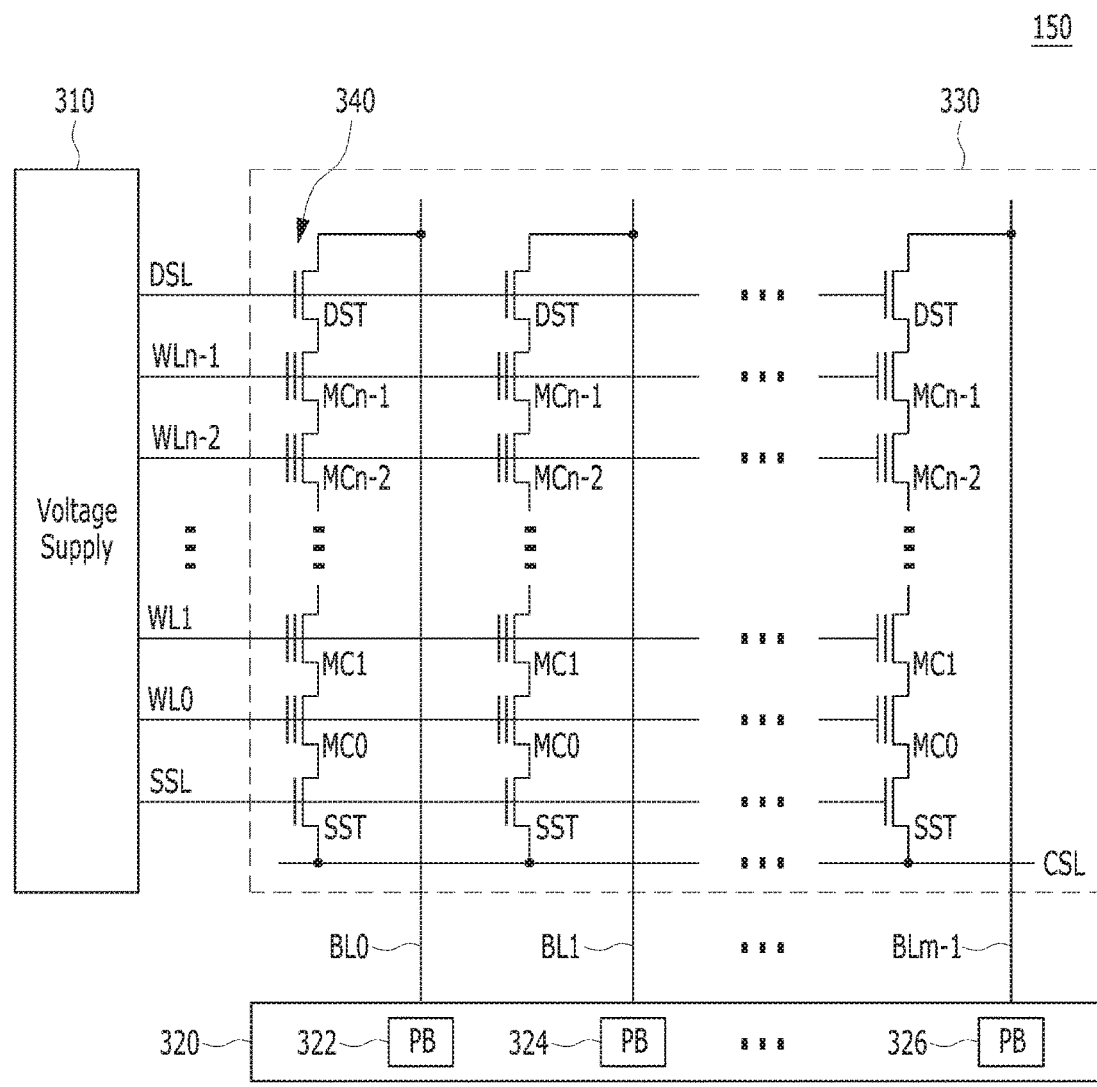
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330, which may be any of the plurality of memory blocks 152 to 156 in the memory device 150 of the memory system 110, may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST, SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and may supply a current or a voltage to bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Figure 4:
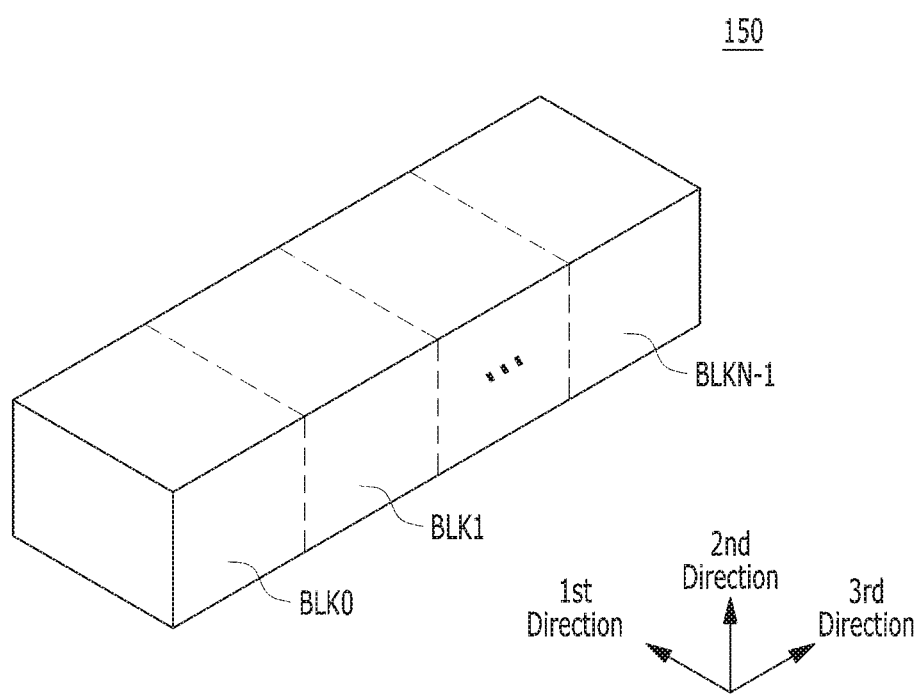
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Detailed description is given, with reference to FIGS. 5 to 8, for data processing with respect to the memory device 150 in a memory system in accordance with an embodiment, particularly, a data processing operation in the case of performing a command operation corresponding to a command received from the host 102 and a data management operation.

Figure 5:
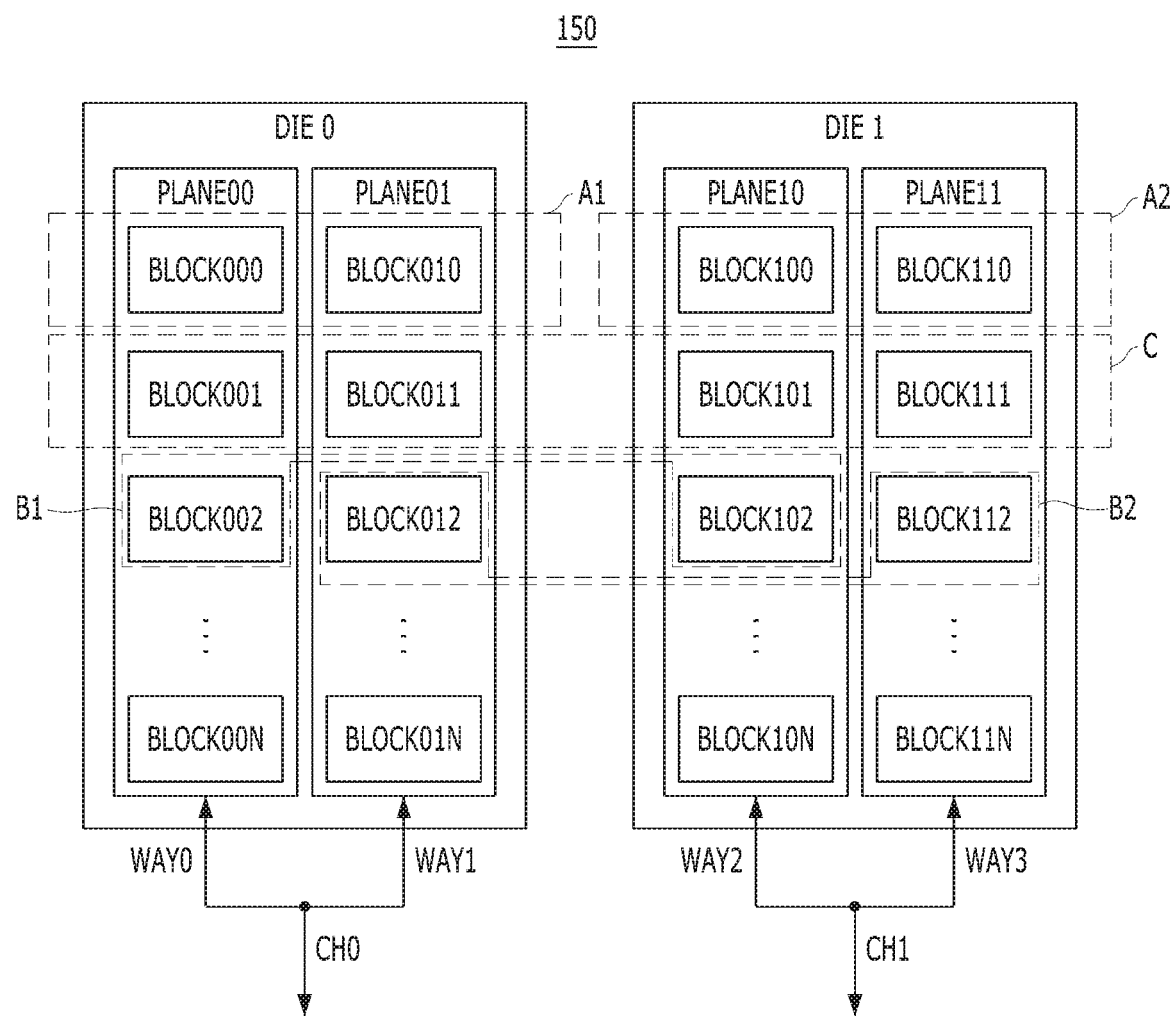
FIG. 5 is a schematic diagram to assist in the explanation of the concept of a super memory block used in a memory system in accordance with an embodiment of the present invention.

FIG. 5 is a diagram to assist in the explanation of the concept of a super memory block used in a memory system in accordance with an embodiment.

Referring to FIG. 5, it may be seen that certain components of the memory device 150, among the components of the memory system 110 shown in FIG. 1, are illustrated in detail.

The memory device 150 includes a plurality of memory blocks BLOCK000, BLOCK001, BLOCK002, . . . and BLCOK00N, BLOCK010, BLOCK011, BLOCK012, . . . and BLCOK01N, BLOCK100, BLOCK101, BLOCK102, . . . and BLCOK10N, and BLOCK110, BLOCK111, BLOCK112, . . . and BLCOK11N.

The memory device 150 includes plural memory dies, which may be respectively coupled with the controller 130 via different channels for data transmission. By way of example but not limitation, the memory device 150 includes a zeroth memory die DIE0 capable of inputting/outputting data through a zeroth channel CH0 and a first memory die DIE1 capable of inputting/outputting data through a first channel CH1. The zeroth channel CH0 and the first channel CH1 may input/output data in an interleaving scheme.

The zeroth memory die DIE0 includes a plurality of planes, e.g., PLANE00 and PLANE01, respectively corresponding to a plurality of ways, e.g., WAY0 and WAY1 that are capable of inputting/outputting data in the interleaving scheme by sharing the zeroth channel CH0.

The first memory die DIE1 also includes a plurality of planes, e.g., PLANE10 and PLANE11, respectively corresponding to a plurality of ways, e.g., WAY2 and WAY3 that are capable of inputting/outputting data in the interleaving scheme by sharing the first channel CH1.

The first plane PLANE00 of the zeroth memory die DIE0 includes a set or predetermined number of memory blocks BLOCK000, BLOCK001, BLOCK002, . . . and BLCOK00N, among the plurality of memory blocks in the memory device 150.

The second plane PLANE01 of the zeroth memory die DIE0 includes a set or predetermined number of memory blocks BLOCK010, BLOCK011, BLOCK012, . . . and BLCOK01N, among the plurality of memory blocks in the memory device 150.

The first plane PLANE10 of the first memory die DIE1 includes a set or predetermined number of memory blocks BLOCK100, BLOCK101, BLOCK102, . . . and BLCOK10N, among the plurality of memory blocks in the memory device.

The second plane PLANE11 of the first memory die DIE1 includes a set or predetermined number of memory blocks BLOCK110, BLOCK111, BLOCK112, . . . and BLCOK11N, among the plurality of memory blocks in the memory device 150.

In this manner, the plurality of memory blocks BLOCK000, BLOCK001, BLOCK002, . . . and BLCOK00N, BLOCK010, BLOCK011, BLOCK012, . . . and BLCOK01N, BLOCK100, BLOCK101, BLOCK102, . . . and BLCOK10N, and BLOCK110, BLOCK111, BLOCK112, . . . and BLCOK11N may be divided according to physical positions such those using the same way or the same channel are grouped together.

By way of example but not limitation, it is illustrated in FIG. 5 that two memory dies are included in the memory device 150, and two planes are included in each of the memory dies. However, according to system configuration and/or design considerations, the number of memory dies in the memory device 150 may be more or less than two, and the number of planes in each memory die also may be more or less than two. Likewise, the number of memory blocks in each plane may be adjusted variously according to system configuration and/or design considerations.

In another embodiment, there is dividing scheme different from the scheme of dividing the plurality of memory blocks in the memory device 150 according to physical positions or locations such as the plurality of memory dies DIE0, DIE1 or the plurality of planes PLANE00, PLANE01, PLANE10, PLANE11. In this other embodiment, the controller 130 may divide a plurality of memory blocks according to simultaneous selection and operation of memory blocks. That is to say, the controller 130 may manage a plurality of memory blocks which are divided into different dies or different planes through the dividing scheme according to physical positions, by grouping memory blocks capable of being selected simultaneously and thereby dividing the plurality of memory blocks into super memory blocks.

How the controller 130 generates or establishes super memory blocks by grouping the plurality of memory blocks may be different according to a system configuration or a design requirement. Three different schemes will be described.

A first scheme is to generate, by the controller 130, one super memory block A1 by grouping a single memory block BLOCK000 in the first plane PLANE00 and another single memory block BLOCK010 in the second plane PLANE01 of the zeroth memory die DIE0. When applying the first scheme to the first memory die DIE1, the controller 130 may generate one super memory block A2 by grouping a single memory block BLOCK100 in the first plane PLANE10 and a single memory block BLOCK110 in the second plane PLANE11 of the first memory die DIE1. In general, the first scheme involves selecting plural memory blocks in different planes of the same memory die to generate or establish a super memory block.

A second scheme is to generate, by the controller 130, one super memory block B1 by grouping one memory block BLOCK002 in the first plane PLANE00 of the zeroth memory die DIE0 and another memory block BLOCK102 in the first plane PLANE10 of the first memory die DIE1. To generate another super block by applying the second scheme again, the controller 130 may group one memory block BLOCK012 in the second plane PLANE01 of the zeroth memory die DIE0 and one memory block BLOCK112 in the second plane PLANE11 of the first memory die DIE1. In the second scheme, the controller 130 may select plural memory blocks in corresponding planes of different memory dies to configure a super memory block.

A third scheme is to generate, by the controller 130, one super memory block C by grouping one memory block BLOCK001 in the first plane PLANE00 of the zeroth memory die DIE0, a second memory block BLOCK011 in the second plane PLANE01 of the zeroth memory die DIE0, a third memory block BLOCK101 in the first plane PLANE10 of the first memory die DIE1, and a fourth memory block BLOCK111 in the second plane PLANE11 of the first memory die DIE1. In the third scheme, the controller 130 may choose a single block from each plane across all of the dies to make a super memory block.

Memory blocks may be arranged in groups such that those in the same super memory block may be selected substantially simultaneously through an interleaving scheme, for example, a channel interleaving scheme, a memory die interleaving scheme, a memory chip interleaving scheme or a way interleaving scheme.

Figure 6A:
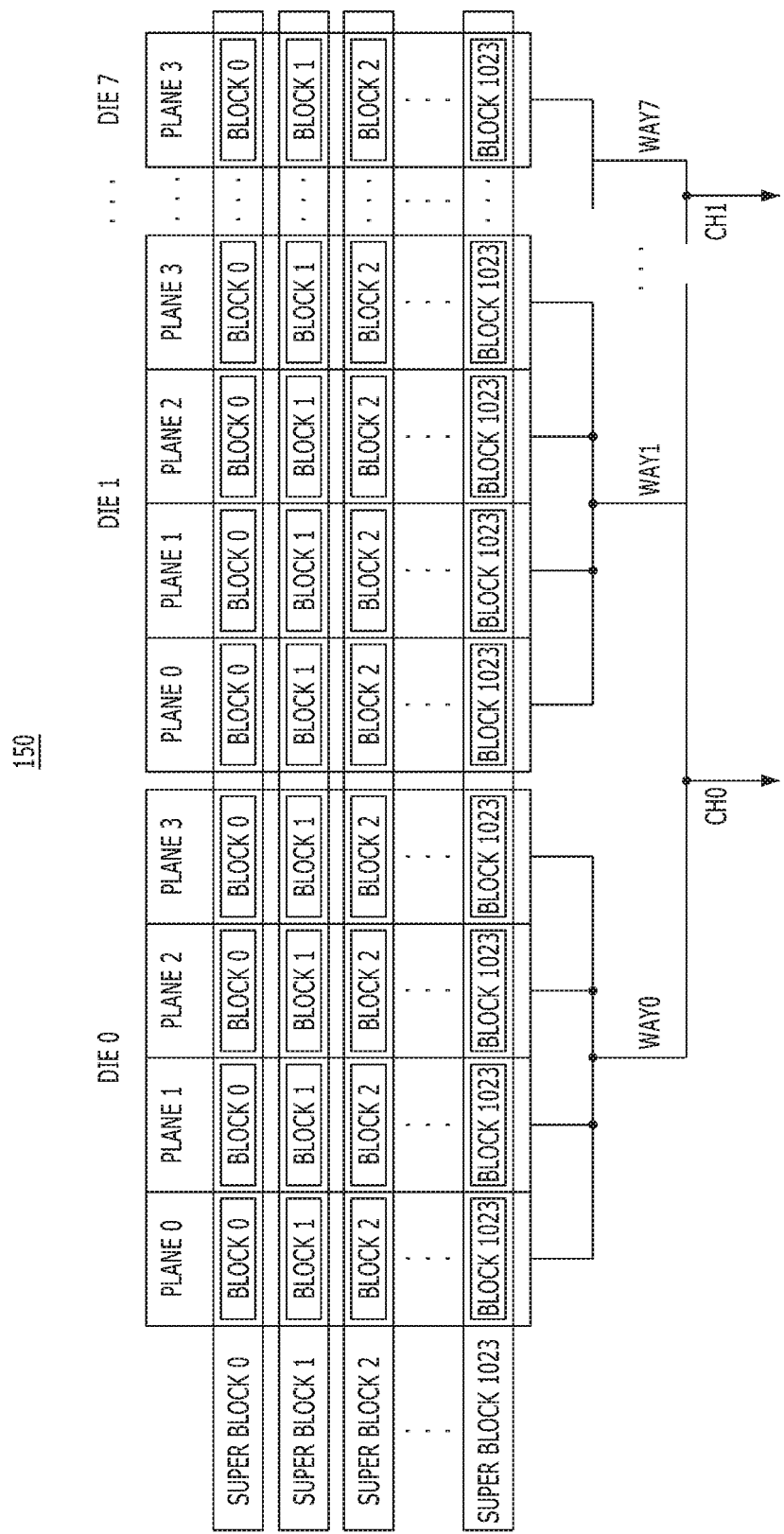
FIGS. 6A and 6B are schematic diagrams to assist in the explanation of an operation of managing memory blocks by the unit of super memory block in the memory system in accordance with an embodiment of the present invention.
Figure 6B:
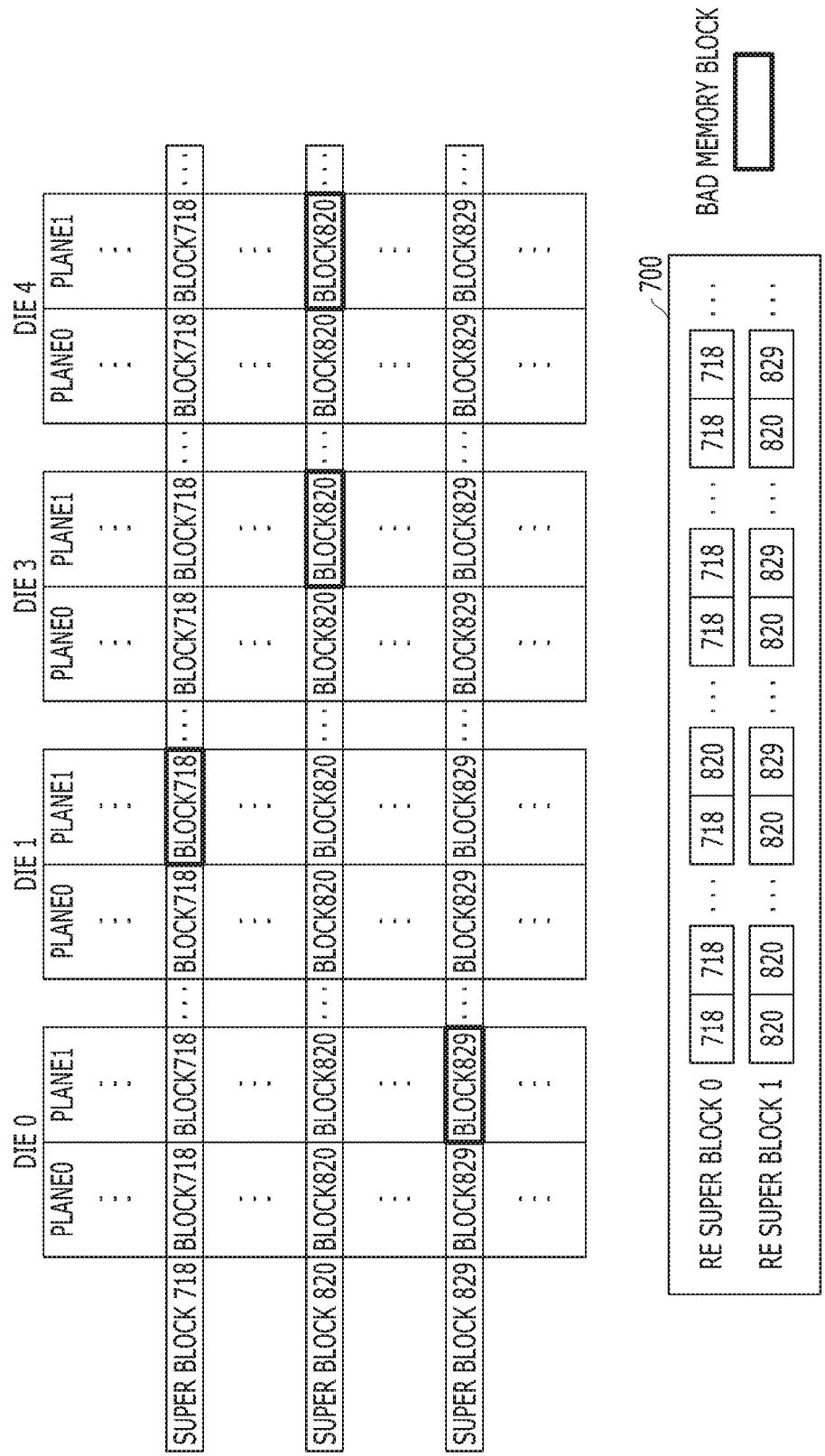

FIGS. 6A and 6B are diagrams to assist in the explanation of an operation of managing memory blocks by the unit of super memory block in the memory system in accordance with an embodiment of the present invention.

Referring to FIG. 6A, a scheme of selecting each of super memory blocks when managing the plurality of memory blocks in the memory device 150 by dividing them into the super memory blocks is described.

In the illustrated embodiment, the memory device 150 includes eight memory dies DIE<0:7>, each of the eight memory dies DIE<0:7> includes four planes PLANE<0:3> to allow the eight memory dies DIE<0:7> to include total 32 planes PLANE<0:3>*8, and each of the 32 planes PLANE<0:3>*8 includes 1024 memory blocks BLOCK<0:1023>. In other words, the exemplary memory device 150 of FIG. 6A includes a total of 32768 memory blocks BLOCK<0:1023>*32.

In the memory device 150, the total 32 planes PLANE<0:3>*8 in the eight memory dies DIE<0:7> are arranged to input/output data through two channels CH<0:1> and eight ways WAY<0:7>. As illustrated, the memory device 150, has two groups of four ways each: WAY<0:3>/WAY<4:7>. WAY<0:3> share one channel CH0, WAY<4:7> share one channel CH1. The four planes PLANE<0:3> in each die share one way. That is, the planes in DIE 0 share WAY0, the planes in DIE 1 share WAY1, . . . , and the planes in DIE 7 share WAY7.

The controller 130 of the memory system 110 uses a scheme of dividing or arranging the plurality of memory blocks in the memory device 150 into super memory blocks to be assigned or allocated for transactions. In particular, it may be seen that the controller 130 according to the embodiment shown in FIG. 6A uses the third scheme to divide memory blocks into super memory blocks as described above with reference to FIG. 5.

That is to say, in FIG. 6A, the controller 130 establishes each of the super memory blocks SUPER BLOCK<0:1023> by selecting one memory block in each of 32 planes PLANE<0:3>*8 in the memory device 150. Therefore, 32 memory blocks are included in each of the super memory blocks SUPER BLOCK<0:1023>.

Since the controller 130 simultaneously selects the 32 memory blocks in any of the super memory blocks SUPER BLOCK<0:1023>, management is performed by the unit of super memory block. Thus, super memory block addresses (not shown) for selecting the respective super memory blocks SUPER BLOCK<0:1023> may be used.

In this manner, to use the super memory block addresses, the controller 130 uses a scheme of generating super memory blocks by grouping memory blocks of the same positions in the respective 32 planes PLANE<0:3>*8 included in the memory device 150.

For example, the controller 130 may establish a zeroth super memory block SUPER BLOCK0 by grouping 32 zeroth memory blocks BLOCK0 in the respective 32 planes PLANE<0:3>*8 in the memory device 150, establish a first super memory block SUPER BLOCK1 by grouping 32 first memory blocks BLOCK1 in the respective 32 planes PLANE<0:3>*8, and establish a second super memory block SUPER BLOCK2 by grouping 32 second memory blocks BLOCK2 in the respective 32 planes PLANE<0:3>*8. In this manner, the controller 130 manages the 32768 memory blocks BLOCK<0:1023>*32 in the memory device 150 by grouping them into 1024 super memory blocks SUPER BLOCK<0:1023>.

By managing the memory blocks BLOCK<0:1023>*32 in the memory device 150, by grouping or dividing them into the super memory blocks SUPER BLOCK<0:1023>, means that the controller 130 sets and uses, as an access processing unit, a super memory block unit. However, even though the controller 130 selects each of the super memory blocks SUPER BLOCK<0:1023> by its corresponding super memory block address, that does not mean that the memory block addresses for respectively selecting the memory blocks BLOCK<0:1023>*32 are not used; rather, each memory block address is continuously used in the controller 130. For example, the fact that the controller 130 accesses the zeroth super memory block SUPER BLOCK0 through a zeroth super memory block address means that 32 memory blocks corresponding to 32 zeroth memory blocks BLOCK0 of the respective 32 planes PLANE<0:4>*8 which are grouped into the zeroth super memory block SUPER BLOCK0 are accessed at once.

It may be substantially impossible for all the memory blocks in the memory device 150, to operate normally. For example, after the memory device 150 is mounted in a system and used, a memory block, among the plurality of memory blocks, ceases to operate normally, thus becoming a bad memory block. Namely, a memory block may be determined as a bad memory block because it does not perform a normal operation even when its lifespan limit is not reached.

In this regard, when grouping memory blocks of the same positions in the respective 32 planes PLANE<0:3>*8 in the memory device 150, as explained above, it is not possible to set, as an access processing unit, a super memory block unit, for a super memory block in which a bad memory block is included.

For example, even when only one memory block is bad and all the remaining 31 memory blocks are good among the 32 memory blocks in any one super memory block among the super memory blocks SUPER BLOCK<0:1023>, it is markedly inefficient to not be able to access that super memory block as a unit.

In consideration of this fact, in the memory system 110 in accordance with an embodiment, a super memory block including at least one bad memory block may be reused, rather than discarded, by employing a regenerated super block table 700 as shown in FIG. 6B.

Referring to FIG. 6B, it may be seen that one or more memory blocks among the 32 memory blocks in each of the 718th super memory block SUPER BLOCK 718, the 820th super memory block SUPER BLOCK 820 and the 829^th super memory block SUPER BLOCK 829, among the plurality of super memory blocks SUPER BLOCK<0: 1023>, in the memory device 150 are determined as bad memory blocks.

In detail, it may be seen that, among the 32 memory blocks in the 718th super memory block, the memory block in the first plane PLANE1 of the first memory die DIE1 is determined as a bad memory block and the remaining 31 memory blocks are good or stable memory blocks.

Also, it may be seen that, among the 32 memory blocks in the 820th super memory block, the memory block in the first plane PLANE1 of the third memory die DIE3 and the memory block in the first plane PLANE1 of the fourth memory die DIE4 are determined as bad memory blocks and the remaining 30 memory blocks are good or stable memory blocks.

Moreover, it may be seen that, among the 32 memory blocks in the 829th super memory block, the memory block in the first plane PLANE1 of the zeroth memory die DIE0 is determined as a bad memory block and the remaining 31 memory blocks are good or stable memory blocks.

In this state, the controller 130 generates the regenerated super block table 700 for replacing the bad memory blocks in the 718th super memory block, the 820th super memory block, and the 829th super memory block with good or stable memory blocks, thereby normally operating regenerated super memory blocks.

In detail, in order to reuse the 718th super memory block SUPER BLOCK 718, among the super memory blocks SUPER BLOCK<0:1023>, the controller 130 searches for a memory block capable of replacing the bad memory block in the first plane PLANE1 of the first memory die DIE1.

To this end, the controller 130 searches a super memory block in which at least one bad memory block is included, among the super memory blocks SUPER BLOCK<0:1023>. That is, the controller 130 may exclude as a search target a super memory block including only good or stable memory blocks.

For recovering or curing the bad memory block in the 718th super memory block, the controller 130 may target the 820th super memory block which includes two bad memory blocks. Then, the controller 130 checks whether the positions of any of the bad memory blocks in the 820th super memory block is the same as the position of the bad memory block in the 718th super memory block.

If the position of any of the bad memory blocks of the 820th super memory block is the same as the position of the bad memory block in the 718th super memory block, the 820th super memory block is excluded as a search target, and another super memory block is searched. Conversely, if there is no positional correspondence, the 820^th super memory block SUPER BLOCK820 is determined as a search target super memory block.

Referring to FIG. 6B, the bad memory block of the 718th super memory block is positioned in the first plane PLANE1 of the first memory die DIE1, while the bad memory blocks of the 820th super memory block are positioned in the first plane PLANE1 of the third memory die DIE3 and the first plane PLANE1 of the fourth memory die DIE4. In other words, the positions of the bad memory blocks in the 820th super memory block do not overlap with the position of the bad memory block in the 718th super memory block.

Therefore, the controller 130 determines the 820th super memory block as a search target, and generates the regenerated super block table 700 such that the memory block in the first plane PLANE1 of the first memory die DIE1 in the 820th super memory block may be used in the 718th super memory block.

Namely, in order to replace the 718th super memory block SUPER BLOCK 718, the controller 130 sets the first row of the regenerated super block table 700 as a zeroth regenerated super memory block RE SUPER BLOCK0, and stores the block address values of 32 memory blocks for replacing the 718th super memory block SUPER BLOCK 718.

Thus, in the values of the zeroth regenerated super memory block RE SUPER BLOCK 0 stored in the first row of the regenerated super block table 700, there is only one block address for indicating the memory block in the first plane PLANE1 of the first memory die DIE1 of the 820th super memory block SUPER BLOCK 820, and all the remaining 31 block addresses are for memory blocks of the 718th super memory block SUPER BLOCK 718.

When the controller 130 accesses the 718th super memory block SUPER BLOCK 718 after the regenerated super block table 700 is generated, the controller 130 may reference the values of the zeroth regenerated super memory block RE SUPER BLOCK 0 stored in the first row of the regenerated super block table 700.

Then, in order to reuse the 820th super memory block SUPER BLOCK 820, the controller 130 should search for memory blocks capable of replacing the memory block in the first plane PLANE1 of the first memory die DIE1, the bad memory block in the first plane PLANE1 of the third memory die DIE3, and the bad memory block in the first plane PLANE1 of the fourth memory die DIE4, among the 32 memory blocks in the 820th super memory block SUPER BLOCK 820. The memory block in the first plane PLANE1 of the first memory die DIE1 is not a bad memory block, but assigned as a substitute for the bad memory block of the 718th super memory block SUPER BLOCK 718.

The reason why memory blocks capable of replacing three memory blocks, among the 32 memory blocks in the 820th super memory block SUPER BLOCK 820, are searched even though there are only two bad memory blocks in the 820th super memory block SUPER BLOCK 820 is that one memory block of the 820th super memory block SUPER BLOCK 820 is used to normally operate the 718th super memory block SUPER BLOCK 718 as a regenerated super memory block. Namely, because the bad memory block is included in the first plane PLANE1 of the first memory die DIE1 in the 718th super memory block SUPER BLOCK 718, the regenerated super block table 700 is generated to use the memory block in the first plane PLANE1 of the first memory die DIE1 in the 820th super memory block SUPER BLOCK 820.

Hence, in order to reuse the 820th super memory block SUPER BLOCK 820, the controller 130 searches for a super memory block in which at least one bad memory block is included. Of course, the controller 130 excludes from such search any super memory block in which only good memory blocks are included.

As a result of the search, the controller 130 may search the 829th super memory block SUPER BLOCK 829 which includes one bad memory block. In this state, the controller 130 checks whether the position of the bad memory block in the 829th super memory block SUPER BLOCK 829 is the same as the position of the bad memory block in the 718th super memory block SUPER BLOCK 718 and the positions of the bad memory blocks in the 820th super memory block SUPER BLOCK 820.

If the same position exists, the 829th super memory block SUPER BLOCK 829 is excluded as a search target, and another super memory block is searched. Conversely, if the same position does not exist, the 829th super memory block SUPER BLOCK 829 is determined as a search target super memory block.

Referring to FIG. 6B, the bad memory block of the 829th super memory block SUPER BLOCK 829 is positioned in the first plane PLANE1 of the zeroth memory die DIE0, the bad memory block of the 718th super memory block SUPER BLOCK 718 is positioned in the first plane PLANE1 of the first memory die DIE1, and the bad memory blocks of the 820th super memory block SUPER BLOCK 820 are positioned in the first plane PLANE1 of the third memory die DIE3 and the first plane PLANE1 of the fourth memory die DIE4. That is to say, the position of the bad memory block of the 829th super memory block does not overlap with the positions of any of the bad memory blocks in the 820th super memory block and the position of the bad memory block in the 718th super memory block.

Therefore, the controller 130 determines the 829th super memory block SUPER BLOCK 829 as a substitute or a search target, and generates the regenerated super block table 700 such that the memory block in the first plane PLANE1 of the first memory die DIE1, the memory block in the first plane PLANE1 of the third memory DIE3 and the memory block in the first plane PLANE1 of the fourth memory die DIE4 in the 829th super memory block SUPER BLOCK 829 may be used in the 820th super memory block SUPER BLOCK 820.

Namely, in order to replace the 820th super memory block SUPER BLOCK 820, the controller 130 sets the second row of the regenerated super block table 700 as a first regenerated super memory block RE SUPER BLOCK1, and stores the respective block address values of 32 memory blocks for replacing the 820th super memory block SUPER BLOCK820.

Thus, the values of the first regenerated super memory block RE SUPER BLOCK 1 stored in the second row of the regenerated super block table 700 only include block addresses for indicating the memory block in the first plane PLANE1 of the first memory die DIE1, the memory block in the first plane PLANE1 of the third memory die DIE3 and the memory block in the first plane PLANE1 of the fourth memory die DIE4 of the 829th super memory block SUPER BLOCK 829, and all the remaining 29 block addresses are the block addresses of the 820th super memory block SUPER BLOCK 820.

In this way, because the regenerated super block table 700 is generated, when the controller 130 accesses the 820th super memory block SUPER BLOCK820, reference may be made to the values of the first regenerated super memory block RE SUPER BLOCK 1 stored in the second row of the regenerated super block table 700.

Then, in order to reuse the 829th super memory block SUPER BLOCK 829, the controller 130 searches for memory blocks capable of replacing the bad memory block in the first plane PLANE1 of the zeroth memory die DIE0, the memory block in the first plane PLANE1 of the first memory die DIE1, the memory block in the first plane PLANE1 of the third memory die DIE3, and the memory block in the first plane PLANE1 of the fourth memory die DIE4 in the 829th super memory block SUPER BLOCK 829.

The reason why memory blocks capable of replacing four memory blocks among the 32 memory blocks included in the 829th super memory block are searched even though a bad memory block is one among the 32 memory blocks in the 829th super memory block resides in that three memory blocks of the 829th super memory block are used to normally operate the 820th super memory block as a regenerated super memory block. Namely, because the bad memory block is in the first plane PLANE1 of the first memory die DIE1 among the 32 memory blocks in the 718th super memory block and the bad memory blocks are included in the first plane PLANE1 of the third memory die DIE3 and the first plane PLANE1 of the fourth memory die DIE4 in the 820th super memory block, the regenerated super block table 700 is generated to use the memory blocks in the first plane PLANE1 of the first memory die DIE1, the first plane PLANE1 of the third memory die DIE3, and the first plane PLANE1 of the fourth memory die DIE4 in the 829th super memory block.

Hence, in order to reuse the 829th super memory block SUPER BLOCK 829, the controller 130 searches for a super memory block in which at least one bad memory block is included, among the super memory blocks SUPER BLOCK<0:1023>. The controller 130 excludes as a search target a super memory block in which only good memory blocks are included.

As a result of the search, the controller 130 may not search for another super memory block which includes a bad memory block. In this case, the controller 130 does not reuse the 829th super memory block SUPER BLOCK 829 because there is no substitute.

By using the regenerated super block table 700 as described above with reference to FIG. 6B, even though bad memory blocks are included in the three super memory blocks SUPER BLOCK 718, SUPER BLOCK 820 and SUPER BLOCK 829 among all of the super memory blocks, it is possible to set, as an access processing unit, super memory block unit for the two super memory blocks SUPER BLOCK 718 and SUPER BLOCK 820.

That is to say, in the scheme as shown in FIG. 6B, some super memory blocks, e.g., SUPER BLOCK 718 and SUPER BLOCK 820, among the super memory blocks SUPER BLOCK 718, SUPER BLOCK 820 and SUPER BLOCK 829 including bad memory blocks, are normally used, and only the remaining super memory block, e.g., SUPER BLOCK 829 is not used.

However, even in the scheme as shown in FIG. 6B, the super memory block SUPER BLOCK 829 still exists, but its good memory blocks cannot be used because they are not grouped by super memory block unit.

Therefore, the memory system 110 in accordance with an embodiment may allow a super memory block which includes a bad memory block for a specific operation or transaction, as will be described below with reference to FIG. 7, such that a good memory block incapable of being used does not exist.

Figure 7:
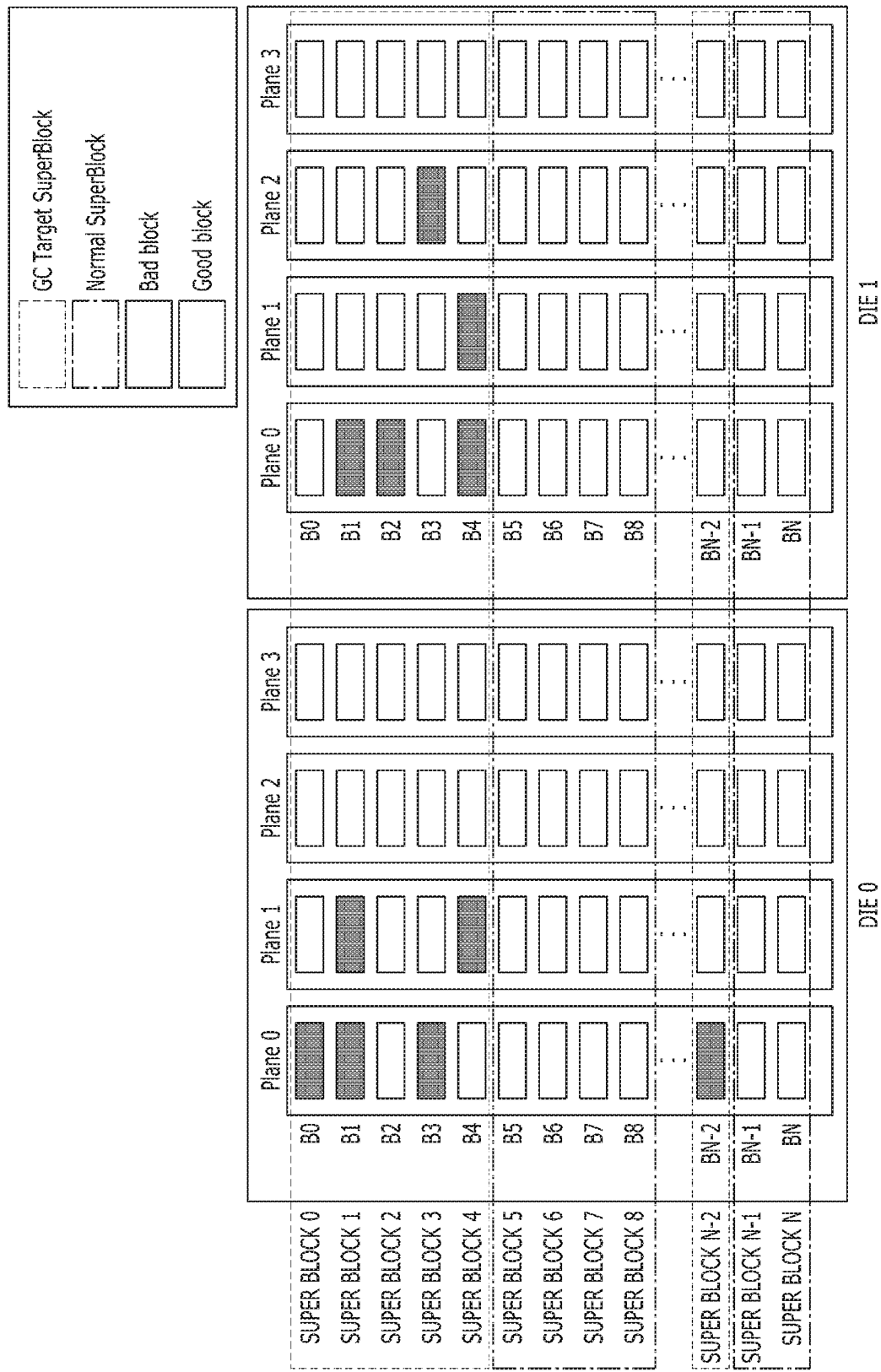
FIG. 7 is a schematic diagram to assist in the explanation of an operation of managing a super memory block including a bad memory block in the memory system in accordance with an embodiment of the present invention.

FIG. 7 is a diagram to assist in the explanation of an operation of managing a super memory block including a bad memory block in the memory system in accordance with an embodiment of the present invention.

Referring to FIG. 7, it is shown that the controller 130 manages super memory blocks by mixing bad memory blocks and good memory blocks among the plurality of memory blocks included in the memory device 150. The controller 130 may manage two different types of super memory blocks: a super memory block including at least one bad memory block and the rest good or stable memory blocks, and a super memory block including only good or stable memory blocks.

First, it is illustrated as an example that the memory device 150 shown in FIG. 7 includes two memory dies DIE<0:1>, each of which includes four planes PLANE<0:3> to allow the two memory dies DIE<0:1> to include eight planes PLANE<0:3>*2. Each of the eight planes PLANE<0:3>*2 includes (N+1) memory blocks B<0:N>.

The controller 130 of the memory system 110 in accordance with an embodiment of the present disclosure uses a scheme of managing the plurality of memory blocks in the memory device 150 by dividing them by the unit of super memory block. In particular, it may be seen that the embodiment of FIG. 7 uses the third scheme of dividing memory blocks into super memory blocks by the controller 130 as described above with reference to FIG. 5.

Referring to FIG. 7, the controller 130 manages each of super memory blocks SUPER BLOCK<0:N> by selecting one memory block in each of the eight planes PLANE<0:3>*2 in the memory device 150. Therefore, eight memory blocks are included in each of the super memory blocks SUPER BLOCK<0:N>.

Further, in the embodiment of FIG. 7, some super memory blocks, each of which includes only good memory blocks, may be managed differently from other super memory blocks, each of which includes at least one bad memory block. The controller 130 may transfer valid data programmed in super memory blocks with at least one bad memory block, into the memory blocks with only good or memory blocks only, not vice versa.

For example, in FIG. 7, in the case of a zeroth super memory block SUPER BLOCK<0>, even though one memory block corresponding to a zeroth plane PLANE<0> of a zeroth die DIE<0> is a bad memory block, the zeroth super memory block SUPER BLOCK<0> is managed by grouping one bad memory block and seven good memory blocks.

In FIG. 7, in the case of a first super memory block SUPER BLOCK<1>, even though three memory blocks corresponding to the zeroth plane PLANE<0> of the zeroth die DIE<0>, a first plane PLANE<1> of the zeroth die DIE<0>, and a zeroth plane PLANE<0> of a first die DIE<1> are bad memory blocks, the first super memory block SUPER BLOCK<1> is managed by grouping three bad memory blocks and five good memory blocks.

In FIG. 7, in the case of a second super memory block SUPER BLOCK<2>, even though one memory block corresponding to the zeroth plane PLANE<0> of the first die DIE<1> is a bad memory block, the second super memory block SUPER BLOCK<2> is managed by grouping one bad memory block and seven good memory blocks.

In FIG. 7, in the case of a third super memory block SUPER BLOCK<3>, even though two memory blocks corresponding to the zeroth plane PLANE<0> of the zeroth die DIE<0> and a second plane PLANE<2> of the first die DIE<1> are bad memory blocks, the third super memory block SUPER BLOCK<3> is managed by grouping two bad memory blocks and six good memory blocks.

In FIG. 7, in the case of a fourth super memory block SUPER BLOCK<4>, even though three memory blocks corresponding to the first plane PLANE<1> of the zeroth die DIE<0>, the zeroth plane PLANE<0> of the first die DIE<1> and the first plane PLANE<1> of the first die DIE<1> are bad memory blocks, the fourth super memory block SUPER BLOCK<4> is managed by grouping three bad memory blocks and five good memory blocks.

In FIG. 7, in the case of an (N−2)th super memory block SUPER BLOCK<N−2>, even though one memory block corresponding to the zeroth plane PLANE<0> of the zeroth die DIE<0> is a bad memory block, the (N−2)th super memory block SUPER BLOCK<N−2> is managed by grouping one bad memory block and seven good memory blocks.

Moreover, in the case of the remaining super memory blocks SUPER BLOCK<5:N−3, N−1, N>, except the super memory blocks SUPER BLOCK<0:4, N−2> in which bad memory blocks and good memory blocks are grouped, since they include no bad memory block, they are managed as normal super memory blocks.

As described above, in FIG. 7, in the case of the super memory blocks SUPER BLOCK<0:4, N−2>, each of which has at least one bad memory block and multiple good memory blocks, it is impossible to set, as an access processing unit, super memory block unit as described above with reference to FIGS. 6A and 6B.

For example, in FIG. 7, in the case of the zeroth super memory block SUPER BLOCK<0>, the second super memory block SUPER BLOCK<2> and the (N−2)th super memory block SUPER BLOCK<N−2>, only seven good memory blocks are included in each of them. In the case of the third super memory block SUPER BLOCK<3>, only six good memory blocks are included. In the case of the first super memory block SUPER BLOCK<1> and the fourth super memory block SUPER BLOCK<4>, only five good memory blocks are included in each of them.

Summarizing the above, the normal super memory blocks SUPER BLOCK<5:N−3, N−1, N>, each of which has no bad memory block, may be handled as an access processing unit with eight normal memory blocks accessed at once. However, the super memory blocks SUPER BLOCK<0:4, N−2>, each including at least one bad memory block, do not satisfy the access processing unit of super memory block unit because eight memory blocks are not accessed at once.

In this consideration, the controller 130 in accordance with an embodiment of the present disclosure manages the super memory blocks SUPER BLOCK<0:4, N−2> each including at least one bad memory block, by classifying them as first super blocks. The first super blocks are used only as target super blocks in a merge operation. Conversely, the normal super memory blocks SUPER BLOCK<5:N−3, N−1, N> in which no bad memory block is included, eight good memory blocks are grouped are managed by being classified as second super blocks. The use of the second super blocks is not specifically limited.

While not concretely illustrated in FIG. 7, there may occur a case where certain second super blocks which have been managed by being classified as the second super blocks in an initial operation of the memory system 110 are managed by being classified as the first super blocks as erase-write cycles are repeatedly performed.

That is to say, there may occur a case where a good memory block of a certain second super block which has been managed by being classified as a second super block in an initial operation of the memory system 110 may be determined as a bad memory block due to repetition of erase-write cycles. In this case, the controller 130 moves the valid data stored in the certain second super block in which a bad has occurred, to a target super block through a merge operation. Then, the controller 130 manages the certain second super block which becomes a free state, as a first super block.

To prevent the reliability of the valid data having been stored in the certain second super block in which the bad has occurred, from degrading, the controller 130 may additionally perform an operation of detecting and correcting an error of the valid data having been stored in the certain second super block in which the bad has occurred. The controller 130 may then move only the valid data determined as being normal, to a target super block through a merge operation.

A merge operation means an operation of merging the valid data included in at least one source super block among the plurality of super memory blocks in the memory device 150 and moving the merged valid data to a target super block which is in a free state.

For example, a merge operation may be a garbage collection operation, a read reclaim operation, a wear leveling operation or a map update operation.

Since a merge operation is defined as described above, it is possible to use the first super blocks as a target super block in a merge operation. This is because a super memory block in which the number of valid data decreases to be equal to or less than a set or predetermined reference is selected as the source super block of a merge operation. In other words, because only the valid data of a source super block are selected and are moved to a target super block through a merge operation, a space for copying the valid data may be sufficient even in the case where the memory blocks included in the target super block are not all in good or stable states.

FIGS. 8A to 8D are diagrams to assist in the explanation of a method for using the super memory block including a bad memory block described in FIG. 7, as a target super block in a merge operation.

Figure 8A:
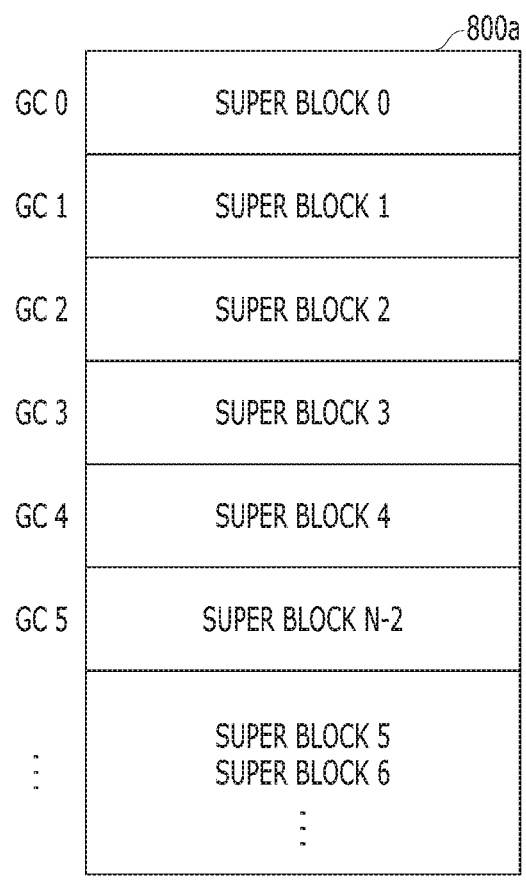
FIGS. 8A to 8D are diagrams to assist in the explanation of a method for using the super memory block including a bad memory block described in FIG. 7, as a target super block in a merge operation in accordance with an embodiment of the present invention.
Figure 8B:
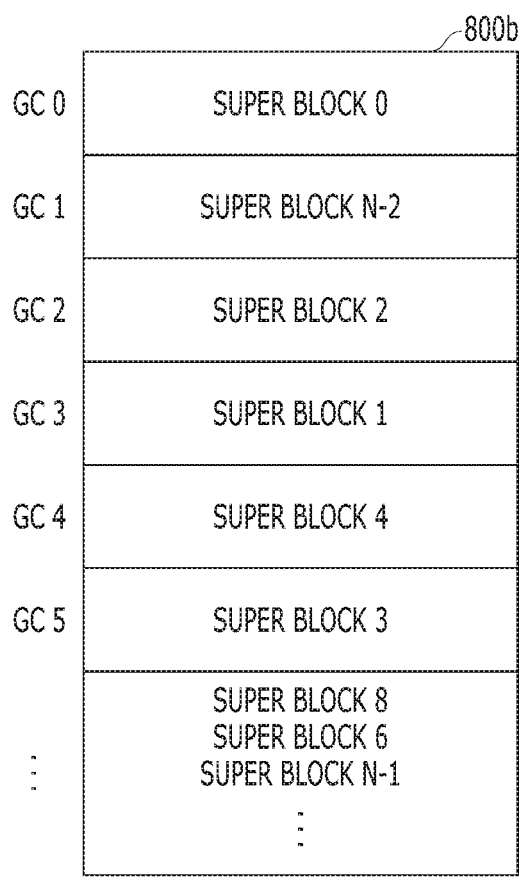

First, referring to FIGS. 8A and 8B, it may be seen that, in accordance with an embodiment of the present disclosure illustrated in FIG. 7, the first super blocks, as the super memory blocks SUPER BLOCK<0:4, N−2>, including bad memory blocks are managed by target lists 800a, 800b to be used as a target super block in a merge operation.

In detail, referring to FIGS. 7, 8A and 8B, the controller 130 manages the super memory blocks SUPER BLOCK<0:4, N−2> in each of which at least one bad memory block and good memory blocks are grouped, as the first super blocks.

Further, the controller 130 manages the super memory blocks SUPER BLOCK<5:N−3, N−1, N>, each of which has only good memory blocks, as the second super blocks.

The controller 130 preferentially uses the first super blocks SUPER BLOCK<0:4, N−2> as a target super block in a merge operation as in the target list 800a shown in FIG. 8A. Then, in the case where the first super blocks SUPER BLOCK<0:4, N−2> are all used as target super blocks, the controller 130 uses the second super blocks SUPER BLOCK<5:N−3, N−1, N> as a target super block in a merge operation.

Furthermore, the controller 130 preferentially uses the first super blocks SUPER BLOCK<0:4, N−2> as a target super block in a merge operation and at the same time determines a use sequence based on erase-write cycle values among the first super blocks SUPER BLOCK<0:4, N−2>, as in the target list 800b shown in FIG. 8B. Then, in the case where the first super blocks SUPER BLOCK<0:4, N−2> are all used as target super blocks, the controller 130 uses even the second super blocks SUPER BLOCK<5:N−3, N−1, N> as a target super block in a merge operation and at the same time determines a use sequence based on erase-write cycle values among the second super blocks SUPER BLOCK<5:N−3, N−1, N>.

Summarizing the above, the controller 130 manages super blocks to be used as target super blocks in a merge operation by a target list corresponding to a set or preset use sequence. The use sequence of a target list may be determined depending on the respective priorities of super blocks to be used as target super blocks.

The super blocks to be used as target super blocks include all of the first super blocks SUPER BLOCK<0:4, N−2> and the second super blocks SUPER BLOCK<5:N−3, N−1, N> which are in a free state.

Also, the respective priorities of the super blocks to be used as target super blocks may be determined based on a reference determined in advance in the controller 130 as in FIG. 8A or 8B.

For example, the controller 130 may determine the respective priorities of super blocks such that, as shown in FIG. 8A, the first super blocks SUPER BLOCK<0:4, N−2> are first used as target super blocks and then the second super blocks SUPER BLOCK<5:N−3, N−1, N> are used as target super blocks.

In other words, if the controller 130 considers whether super blocks belong to the first super blocks SUPER BLOCK<0:4, N−2> or the second super blocks SUPER BLOCK<5:N−3, N−1, N>, as a condition, to determine the use sequence of the target list 800a, the target list 800a may be generated as shown in FIG. 8A.

In detail, in FIG. 8A, the controller 130 sequentially includes the first super blocks SUPER BLOCK<0:4, N−2> which are in a free state, in the target list 800a, depending on the addresses thereof. Then, the controller 130 sequentially adds or includes the second super blocks SUPER BLOCK<5:N−3, N−1, N> which are in a free state, in the target list 800a, depending on the addresses thereof.

Therefore, a target super block GC0 to be used first in a merge operation through the target list 800a of FIG. 8A is the zeroth super memory block SUPER BLOCK<0> which has an address first among the first super blocks SUPER BLOCK<0:4, N−2>.

A target super block GC1 to be used second in a merge operation through the target list 800a of FIG. 8A is the first super memory block SUPER BLOCK<1> which has an address second among the first super blocks SUPER BLOCK<0:4, N−2>.

A target super block GC2 to be used third in a merge operation through the target list 800a of FIG. 8A is the second super memory block SUPER BLOCK<2> which has an address third among the first super blocks SUPER BLOCK<0:4, N−2>.

A target super block GC3 to be used fourth in a merge operation through the target list 800a of FIG. 8A is the third super memory block SUPER BLOCK<3> which has an address fourth among the first super blocks SUPER BLOCK<0:4, N−2>.

A target super block GC4 to be used fifth in a merge operation through the target list 800a of FIG. 8A is the fourth super memory block SUPER BLOCK<4> which has an address fifth among the first super blocks SUPER BLOCK<0:4, N−2>.

A target super block GC5 to be used sixth in a merge operation through the target list 800a of FIG. 8A is the (N−2)th super memory block SUPER BLOCK<N−2> which has an address sixth among the first super blocks SUPER BLOCK<0:4, N−2>.

In this way, when the use sequence is determined up to the target super block GC5 to be used sixth in a merge operation through the target list 800a of FIG. 8A, the use sequence of the first super blocks SUPER BLOCK<0:4, N−2> is completely determined.

Therefore, as target super blocks to be used beyond the sixth in a merge operation through the target list 800a of FIG. 8A, the second super blocks SUPER BLOCK<5:N−3, N−1, N> which are in a free state are sequentially included in the target list 800a in the order of their addresses.

Further, as in the target list 800b shown in FIG. 8B, the controller 130 preferentially uses the first super blocks SUPER BLOCK<0:4, N−2> as a target super block in a merge operation and at the same time determines a use sequence based on the erase-write cycle values among the first super blocks SUPER BLOCK<0:4, N−2>, and then, uses the second super blocks SUPER BLOCK<5:N−3, N−1, N> as a target super block in a merge operation and at the same time determines a use sequence based on the erase-write cycle values among the second super blocks SUPER BLOCK<5:N−3, N−1, N>.

Namely, if the controller 130 considers whether super blocks belong to the first super blocks SUPER BLOCK<0:4, N−2> or the second super blocks SUPER BLOCK<5:N−3, N−1, N>, as a condition, to determine the use sequence of the target list 800b and at the same time uses the magnitudes of the erase-write cycle values of super blocks, as a condition, the target list 800b may be generated as shown in FIG. 8B.

In detail, in FIG. 8B, the controller 130 sets a first super block having a relatively low erase-write cycle value, among the first super blocks SUPER BLOCK<0:4, N−2>, to a first priority. The controller 130 sets a first super block having a relatively high erase-write cycle value, among the first super blocks SUPER BLOCK<0:4, N−2>, to a second priority lower than the first priority. The controller 130 sets a second super block having a relatively low erase-write cycle value, among the second super blocks SUPER BLOCK<5:N−3, N−1, N>, to a third priority lower than the second priority. The controller 130 sets a second super block having a relatively high erase-write cycle value, among the second super blocks SUPER BLOCK<5:N−3, N−1, N>, to a fourth priority lower than the third priority. In this way, the controller 130 sets the respective priorities of the first super blocks SUPER BLOCK<0:4, N−2> and the second super blocks SUPER BLOCK<5:N−3, N−1, N>, determines a use sequence and manages the target list 800b such that super blocks of relatively high priorities are used first.

It may be assumed that, among the first super blocks SUPER BLOCK<0:4, N−2>, the zeroth super memory block SUPER BLOCK<0> has a smallest erase-write cycle value, the (N−2)th super memory block SUPER BLOCK<N−2> has a second smallest erase-write cycle value, the second super memory block SUPER BLOCK<2> has a third smallest erase-write cycle value, the first super memory block SUPER BLOCK<1> has a fourth smallest erase-write cycle value, the fourth super memory block SUPER BLOCK<4> has a fifth smallest erase-write cycle value, and the third super memory block SUPER BLOCK<3> has a largest erase-write cycle value (that is, the erase-write cycle values from smallest to largest are: SUPER BLOCK<0> <SUPER BLOCK<N−2> <SUPER BLOCK<2> <SUPER BLOCK<1> <SUPER BLOCK<4> <SUPER BLOCK<3>).

Also, it may be assumed that, among the second super blocks SUPER BLOCK<5:N−3, N−1, N>, the eighth super memory block SUPER BLOCK<8> has a smallest erase-write cycle value, the sixth super memory block SUPER BLOCK<6> has a second smallest erase-write cycle value and the (N−1)th super memory block SUPER BLOCK<N−1> has a largest erase-write cycle value (that is, the erase-write cycle values from smallest to largest are: SUPER BLOCK<8> <SUPER BLOCK<6> <SUPER BLOCK<N−1> . . . ).

Therefore, a target super block GC0 to be used first in a merge operation through the target list 800b of FIG. 8B is the zeroth super memory block SUPER BLOCK<0>, which has a smallest erase-write cycle value among the first super blocks SUPER BLOCK<0:4, N−2>.

A target super block GC1 to be used second in a merge operation through the target list 800b of FIG. 8B is the (N−2)th super memory block SUPER BLOCK<N−2>, which has a second smallest erase-write cycle value among the first super blocks SUPER BLOCK<0:4, N−2>.

A target super block GC2 to be used third in a merge operation through the target list 800b of FIG. 8B is the second super memory block SUPER BLOCK<2>, which has a third smallest erase-write cycle value among the first super blocks SUPER BLOCK<0:4, N−2>.

A target super block GC3 to be used fourth in a merge operation through the target list 800b of FIG. 8B is the first super memory block SUPER BLOCK<1>, which has a fourth smallest erase-write cycle value among the first super blocks SUPER BLOCK<0:4, N−2>.

A target super block GC4 to be used fifth in a merge operation through the target list 800b of FIG. 8B is the fourth super memory block SUPER BLOCK<4>, which has a fifth smallest erase-write cycle value among the first super blocks SUPER BLOCK<0:4, N−2>.

A target super block GC5 to be used sixth in a merge operation through the target list 800b of FIG. 8B is the third super memory block SUPER BLOCK<3>, which has a sixth smallest erase-write cycle value among the first super blocks SUPER BLOCK<0:4, N−2>.

In this way, when the use sequence is determined up to the target super block GC5 to be used sixth in a merge operation through the target list 800b of FIG. 8B, the use sequence of the first super blocks SUPER BLOCK<0:4, N−2> is completely determined.

Therefore, as target super blocks to be used beyond the sixth in a merge operation through the target list 800b of FIG. 8B, the second super blocks SUPER BLOCK<5:N−3, N−1, N> which are in a free state are sequentially included in the target list 800b in ascending order of their erase-write cycle values.

That is to say, a target super block to be used seventh in a merge operation through the target list 800b of FIG. 8B is the eighth super memory block SUPER BLOCK<8>, which has a smallest erase-write cycle value among the second super blocks SUPER BLOCK<5:N−3, N−1, N>.

A target super block to be used eighth in a merge operation through the target list 800b of FIG. 8B is the sixth super memory block SUPER BLOCK<6>, which has a second smallest erase-write cycle value among the second super blocks SUPER BLOCK<5:N−3, N−1, N>.

A target super block to be used ninth in a merge operation through the target list 800b of FIG. 8B is the (N−1)th super memory block SUPER BLOCK<N−1>, which has a third smallest erase-write cycle value among the second super blocks SUPER BLOCK<5:N−3, N−1, N>.

Figure 8C:
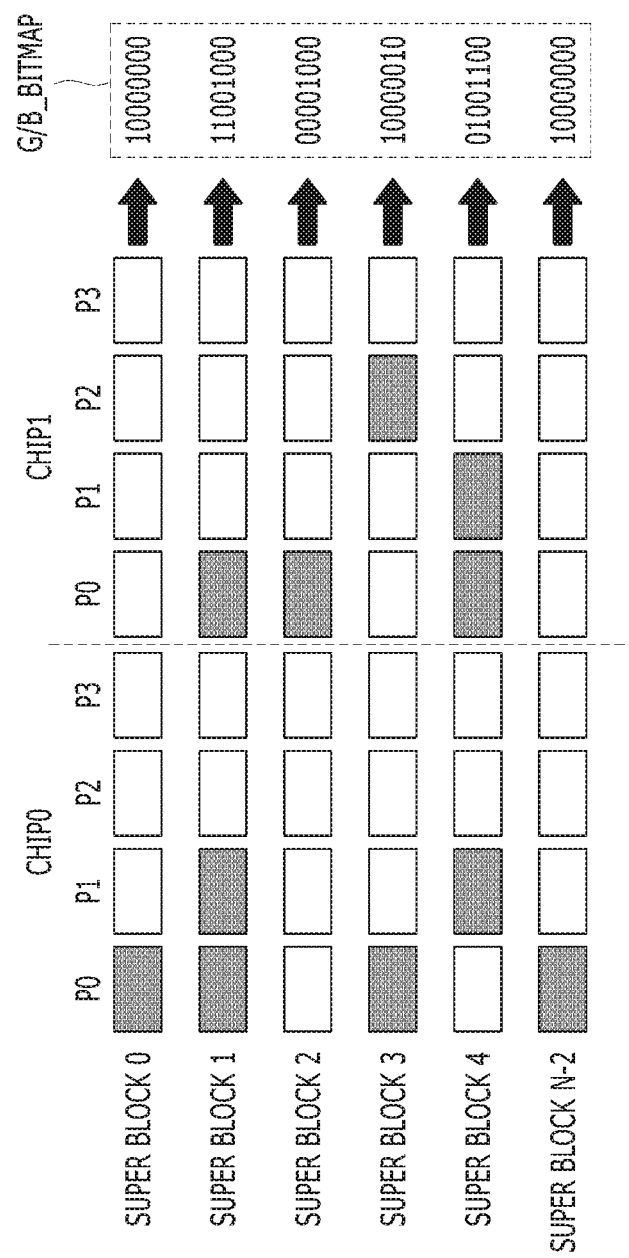

Referring to FIG. 8C, it may be seen that the first super blocks SUPER BLOCK<0:4, N−2> managed as target super blocks through the target lists 800a and 800b are each used as a target super block in an actual merge operation.

In detail, referring to FIGS. 7 and 8C together, the controller 130 manages the good/bad states of the memory blocks grouped into the first super blocks SUPER BLOCK<0:4, N−2> using a state bitmap G/B BITMAP.

That is to say, in the case of the zeroth super memory block SUPER BLOCK<0>, among the first super blocks SUPER BLOCK<0:4, N−2>, one memory block corresponding to the zeroth plane PLANE<0> of the zeroth die DIE<0> is a bad memory block, and the remainder are good memory blocks. Thus, the value of the state bitmap G/B BITMAP corresponding to the zeroth super memory block SUPER BLOCK<0> is '10000000.'

In the case of the first super memory block SUPER BLOCK<1>, among the first super blocks SUPER BLOCK<0:4, N−2>, three memory blocks corresponding to the zeroth plane PLANE<0> of the zeroth die DIE<0>, the first plane PLANE<1> of the zeroth die DIE<0> and the zeroth plane PLANE<0> of the first die DIE<1> are bad memory blocks, and the remainder are good memory blocks. Thus, the value of the state bitmap G/B BITMAP corresponding to the first super memory block SUPER BLOCK<1> is '11001000.'

In the case of the second super memory block SUPER BLOCK<2>, among the first super blocks SUPER BLOCK<0:4, N−2>, one memory block corresponding to the zeroth plane PLANE<0> of the first die DIE<1> is a bad memory block, and the remainder are good memory blocks. Thus, the value of the state bitmap G/B BITMAP corresponding to the second super memory block SUPER BLOCK<2> is '00001000.'

In the case of the third super memory block SUPER BLOCK<3>, among the first super blocks SUPER BLOCK<0:4, N−2>, two memory blocks corresponding to the zeroth plane PLANE<0> of the zeroth die DIE<0> and the second plane PLANE<2> of the first die DIE<1> are bad memory blocks, and the remainder are good memory blocks. Thus, the value of the state bitmap G/B BITMAP corresponding to the third super memory block SUPER BLOCK<3> is '10000010.'

In the case of the fourth super memory block SUPER BLOCK<4>, among the first super blocks SUPER BLOCK<0:4, N−2>, three memory blocks corresponding to the first plane PLANE<1> of the zeroth die DIE<0>, the zeroth plane PLANE<0> of the first die DIE<1> and the first plane PLANE<1> of the first die DIE<1> are bad memory blocks, and the remainder are good memory blocks. Thus, the value of the state bitmap G/B BITMAP corresponding to the fourth super memory block SUPER BLOCK<4> is '01001100.'

In the case of the (N−2)th super memory block SUPER BLOCK<N−2>, among the first super blocks SUPER BLOCK<0:4, N−2>, one memory block corresponding to the zeroth plane PLANE<0> of the zeroth die DIE<0> is a bad memory block, and the remainder are good memory blocks. Thus, the value of the state bitmap G/B BITMAP corresponding to the (N−2)th super memory block SUPER BLOCK<N−2> is '10000000.'

As described above, the controller 130 manages the good/bad states of the memory blocks grouped into the first super blocks SUPER BLOCK<0:4, N−2> using the state bitmap G/B BITMAP. Thus, when using any of the first super blocks SUPER BLOCK<0:4, N−2> as a target super block of a merge operation, the controller 130 may quickly and accurately find good memory blocks.

In detail, when performing a merge operation, the controller 130 may select a target super block among the first super blocks SUPER BLOCK<0:4, N−2> according to the use sequences of the target lists 800a and 800b.

The controller 130 should store the valid data transferred from a source super block, only in the good memory blocks of the first super blocks SUPER BLOCK<0:4, N−2> which are selected for the merge operation.

Therefore, after selecting the first super blocks SUPER BLOCK<0:4, N−2> for a merge operation, the controller 130 may quickly and accurately know where the good memory blocks of the first super blocks SUPER BLOCK<0: 4, N−2> selected for the merge operation are positioned, by checking the state bitmap G/B BITMAP.

In this way, the controller 130 stores the valid data transferred from the source super block only in the good memory blocks of the first super blocks SUPER BLOCK<0: 4, N−2>, which are selected for the merge operation, as a result of checking the state bitmap G/B BITMAP.

Figure 8D:
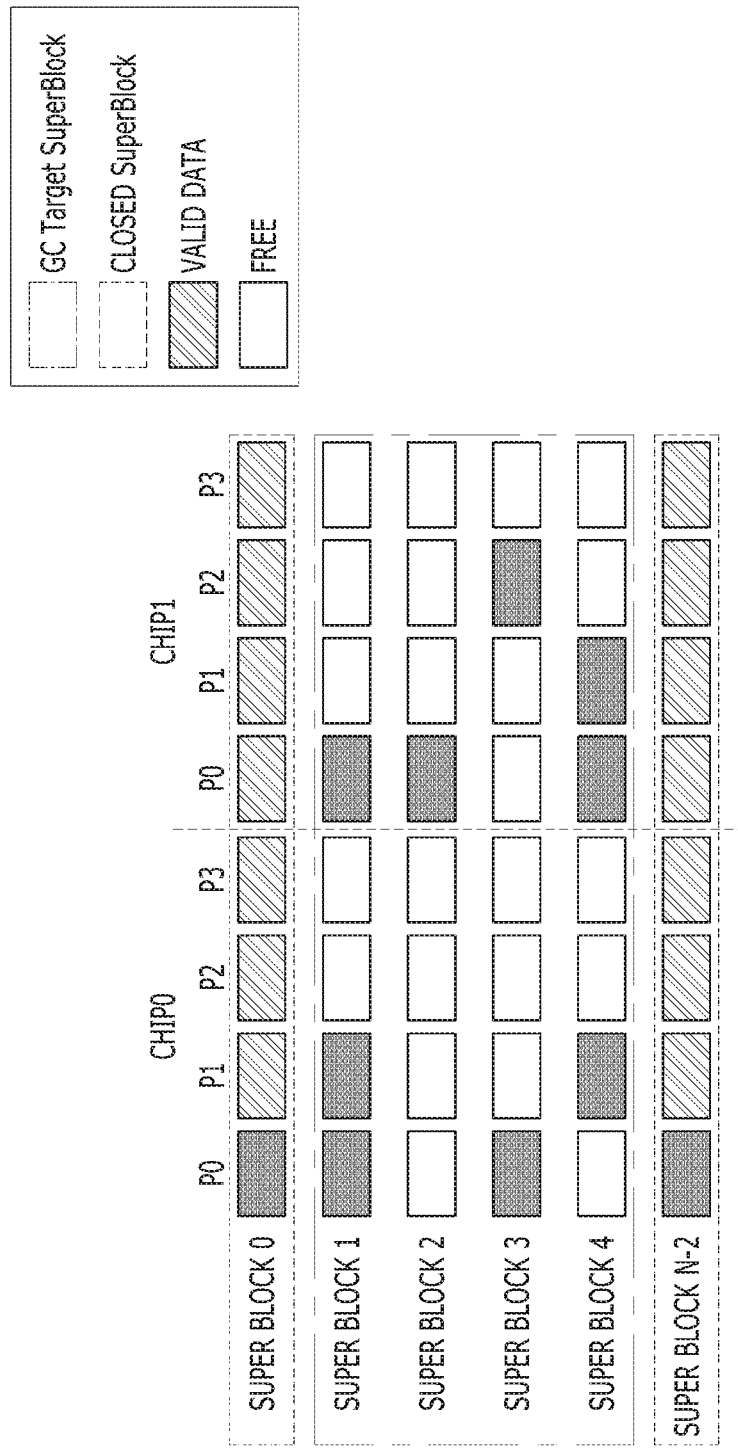

Referring to FIG. 8D, the controller 130 manages first super blocks SUPER BLOCK<0, N−2>, which are in a closed state as they are used as target super blocks in merge operations, among the first super blocks SUPER BLOCK<0: 4, N−2>, and the valid data transferred from source super blocks are stored therein by classifying the first super blocks SUPER BLOCK<0, N−2> as third super blocks. That is to say, although the first super memory blocks SUPER BLOCK<0, N−2>, which are in a free state, are managed by being classified as the first super blocks SUPER BLOCK<0: 4, N−2> before a merge operation is performed, as the first super blocks SUPER BLOCK<0, N−2> are selected as target super blocks in the course of performing merge operations and the valid data transferred from source super blocks are stored therein, the first super blocks SUPER BLOCK<0, N−2> assume a closed state and are managed by being classified as the third super blocks.

In detail, referring to FIGS. 7 and 8B to 8D, the controller 130 may first use the zeroth super memory block SUPER BLOCK<0>, among the first super blocks SUPER BLOCK<0:4, N−2>, as a target super block in a merge operation, according to the use sequence in the target list 800b of FIG. 8B.

Then, the controller 130 may second use the (N−2)th super memory block SUPER BLOCK<N−2>, among the first super blocks SUPER BLOCK<0:4, N−2>, as a target super block in a merge operation, according to the use sequence in the target list 800b of FIG. 8B.

In this way, after using the (N−2)th super memory block SUPER BLOCK<N−2> in a second order according to the use sequence in the target list 800b of FIG. 8B, as a target super block in a merge operation, the controller 130 may not use the second super memory block SUPER BLOCK<2>, the first super memory block SUPER BLOCK<1>, the fourth super memory block SUPER BLOCK<4> and the third super memory block SUPER BLOCK<3> as a target super block in a merge operation.

Therefore, as shown in FIG. 8D, in the good memory blocks of the zeroth super memory block SUPER BLOCK<0> and the (N−2)th super memory block SUPER BLOCK<N−2>, among the first super blocks SUPER BLOCK<0:4, N−2> which are used as target super blocks through performing of merge operations, there are stored valid data transferred from source super blocks through the merge operations. In other words, the good memory blocks of the zeroth super memory block SUPER BLOCK<0> and the (N−2)th super memory block BLOCK<N−2> among the first super blocks SUPER BLOCK<0:4, N−2> which are used as the target super blocks are in a closed state through performing of the merge operations. Conversely, the good memory blocks of the second super memory block SUPER BLOCK<2>, the first super memory block SUPER BLOCK<1>, the fourth super memory block SUPER BLOCK<4> and the third super memory block SUPER BLOCK<3> which are included only in the target list 800b and are not used yet as target super blocks through merge operations are in a free state.

In this state, the controller 130 manages the zeroth super memory block SUPER BLOCK<0> and the (N−2)th super memory block SUPER BLOCK<N−2> among the first super blocks SUPER BLOCK<0:4, N−2> in which the valid data transferred from the source super blocks are stored through the merge operations, by classifying them as the third super blocks.

Then, the controller 130 may select the third super blocks SUPER BLOCK<0, N−2> as source super blocks, erase them through performing of a merge operation, and thereby change them into a free state again.

In detail, after starting to classify and manage the third super blocks SUPER BLOCK<0, N−2> among the first super blocks SUPER BLOCK<0:4, N−2>, in the case of performing a merge operation at a timing when a sufficient time elapses, the controller 130 may select the third super blocks SUPER BLOCK<0, N−2> as source super blocks. In this way, in the case of selecting the third super blocks SUPER BLOCK<0, N−2> as source super blocks, the controller 130 may select and use the second super blocks SUPER BLOCK<5:N−3, N−1, N> in the use sequence of the target list 800b, as a target super block. Namely, the controller 130 may recognize that the third super blocks SUPER BLOCK<0, N−2> are selected as source super blocks in a merge operation, and select target super blocks not among the first super blocks SUPER BLOCK<1:4> but among the second super blocks SUPER BLOCK<5:N−3, N−1, N>.

Thereafter, the controller 130 transfers the valid data stored in the good memory blocks of the third super blocks SUPER BLOCK<0, N−2> which are selected as source super blocks, to a target super block, through performing of a merge operation. Then, the controller 130 converts the good memory blocks of the third super blocks SUPER BLOCK<0, N−2> which are selected as the source super blocks, into a free state, by erasing them, and manages the third super blocks SUPER BLOCK<0, N−2> which are converted into the free state, by classifying them as the first super blocks SUPER BLOCK<0:4, N−2> again.

For reference, when a sufficient time elapses may be when the second super blocks SUPER BLOCK<5:N−3, N−1, N> start to be used as a target super block as the entire first super blocks SUPER BLOCK<0:4, N−2> are used as target super blocks.

Also, when a sufficient time elapses may be when first super blocks of a specified number or less are left as first super blocks of a specified percentage or over are used among the first super blocks SUPER BLOCK<0:4, N−2>.

FIGS. 9 to 17 are diagrams schematically illustrating exemplary applications of the data processing system of FIG. 1 in accordance with various embodiments of the present invention.

Figure 9:
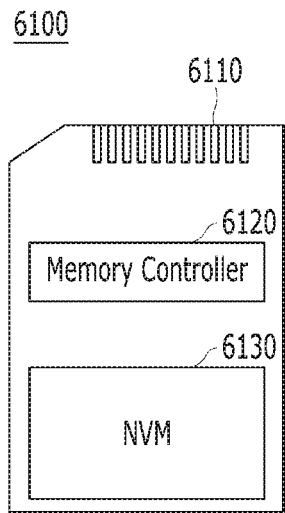
FIGS. 9 to 17 are diagrams schematically illustrating exemplary applications of the data processing system shown in FIG. 1 in accordance with various embodiments of the present invention.

FIG. 9 is a diagram schematically illustrating another example of the data processing system including the memory system. FIG. 9 schematically illustrates a memory card system to which the memory system may be applied.

Referring to FIG. 9, the memory card system 6100 may include a memory controller 6120, a memory device 6130 and a connector 6110.

The memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and use firmware for controlling the memory device 6130. That is, the memory controller 6120 may correspond to the controller 130 of the memory system 110 described with reference to FIGS. 1 and 7, and the memory device 6130 may correspond to the memory device 150 of the memory system 110 described with reference to FIGS. 1 and 7.

Thus, the memory controller 6120 may include a RAM, a processor, a host interface, a memory interface and an error correction component. The memory controller 130 may further include the elements shown in FIG. 7.

The memory controller 6120 may communicate with an external device, for example, the host 102 of FIG. 1 through the connector 6110. For example, as described with reference to FIG. 1, the memory controller 6120 may be configured to communicate with an external device according to one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices, particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 7.

The memory controller 6120 and the memory device 6130 may be integrated into a single semiconductor device. For example, the memory controller 6120 and the memory device 6130 may be so integrated to form a solid state driver (SSD). Also, the memory controller 6120 and the memory device 6130 may be so integrated to form a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC) and a universal flash storage (UFS).

Figure 10:
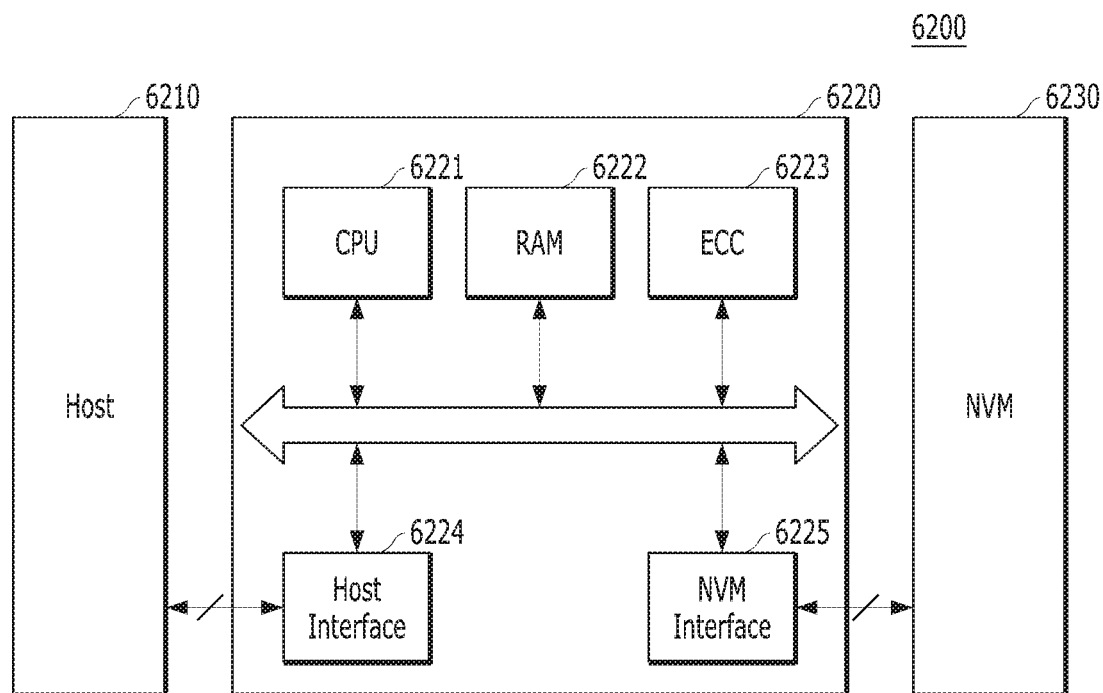

FIG. 10 is a diagram schematically illustrating another example of the data processing system including the memory system.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 7, and the memory controller 6220 may correspond to the controller 130 in the memory system 110 illustrated in FIGS. 1 and 7.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices, particularly a mobile electronic device.

Figure 11:
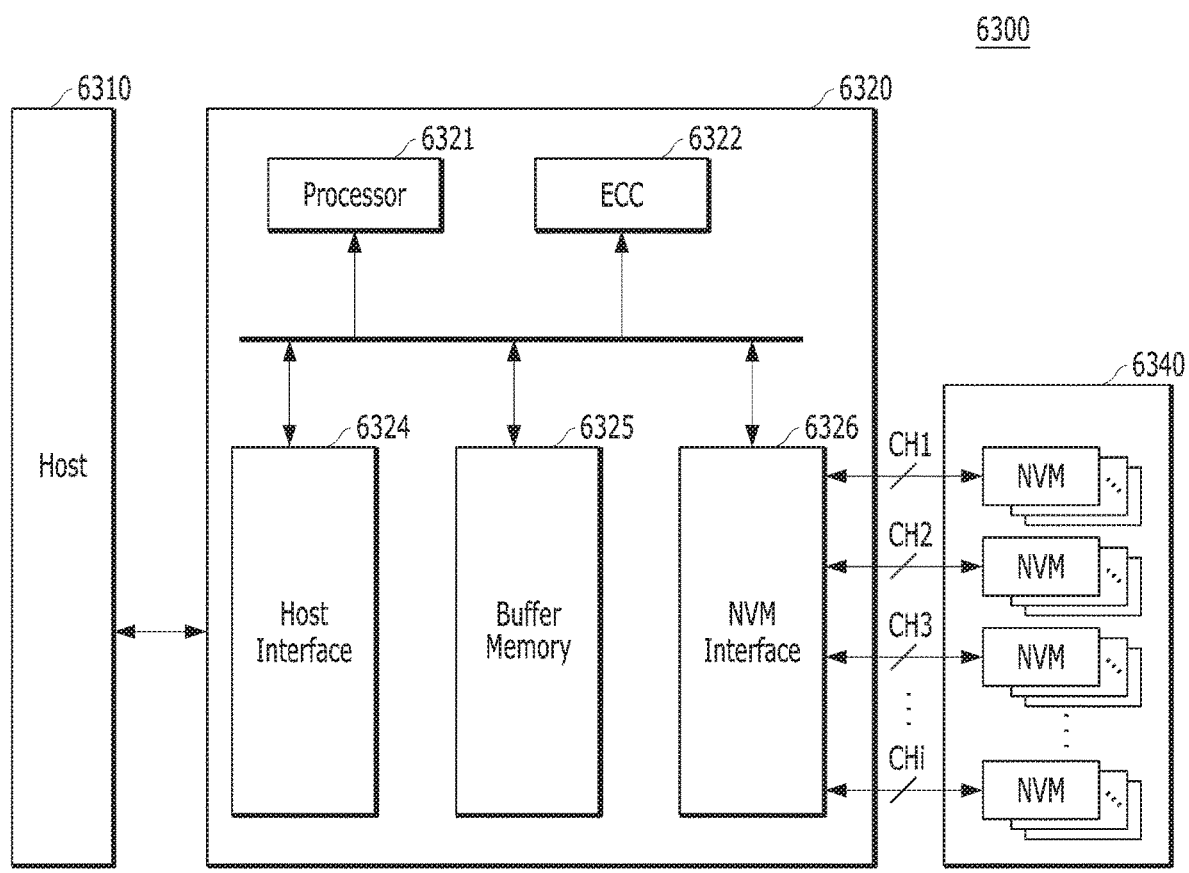

FIG. 11 is a diagram schematically illustrating another example of the data processing system. FIG. 11 schematically illustrates an SSD to which the memory system may be applied.

Referring to FIG. 11, the SSD 6300 may include a controller 6320 and a memory device 6340 including a plurality of nonvolatile memories. The controller 6320 may correspond to the controller 130 in the memory system 110 of FIGS. 1 and 7, and the memory device 6340 may correspond to the memory device 150 in the memory system of FIGS. 1 and 7.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. By way of example, FIG. 10 illustrates that the buffer memory 6325 is in the controller 6320. However, the buffer memory 6325 may be external to the controller 6320.

The ECC circuit 6322 may calculate an ECC value of data to be programmed to the memory device 6340 during a program operation, perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 and 7 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 12:
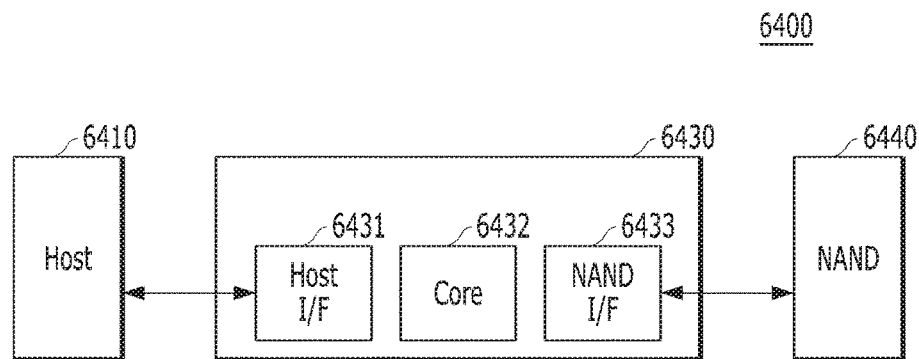

FIG. 12 is a diagram schematically illustrating another example of the data processing system including the memory system. FIG. 12 schematically illustrates an embedded Multi-Media Card (eMMC) to which the memory system may be applied.

Referring to FIG. 12, the eMMC 6400 may include a controller 6430 and a memory device 6440 embodied by one or more NAND flash memories. The controller 6430 may correspond to the controller 130 in the memory system 110 of FIGS. 1 and 7, and the memory device 6440 may correspond to the memory device 150 in the memory system 110 of FIGS. 1 and 7.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with embodiments. FIGS. 13 to 16 schematically illustrate UFS (Universal Flash Storage) systems to which the memory system may be applied.

Referring to FIGS. 13 to 16, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 and 7. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 10 to 12, and the UFS cards 6530, 6630, 6730, 6830 may be embodied in the form of the memory card system 6100 described with reference to FIG. 9.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Alternatively, the UFS devices 6520, 6620, 6720, 6820 and the UFS cards 6530, 6630, 6730, 6830 may communicate with each other through various protocols other than the UFS protocol, for example, an UFDs, a MMC, a SD, a mini-SD, and a micro-SD.

Figure 13:
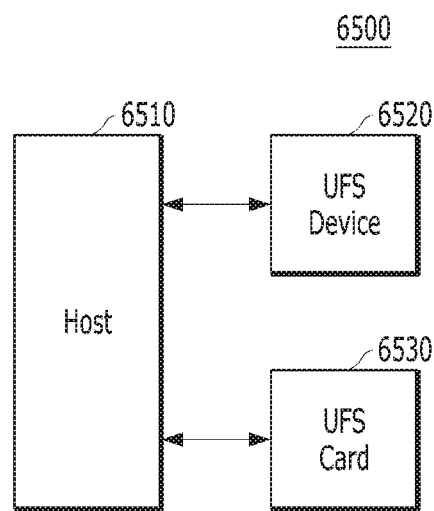

In the UFS system 6500 illustrated in FIG. 13, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the present embodiment, the configuration in which one UFS device 6520 and one UFS card 6530 are connected to the host 6510 has been described and illustrated. However, this is merely an example; a plurality of UFS devices and UFS cards may be connected in parallel or in the form of a star to the host 6410. The star form is an arrangement in which a single centralized component is coupled to plural devices for parallel processing. A plurality of UFS cards may be connected in parallel or in the form of a star to the UFS device 6520 or connected in series or in the form of a chain to the UFS device 6520.

Figure 14:
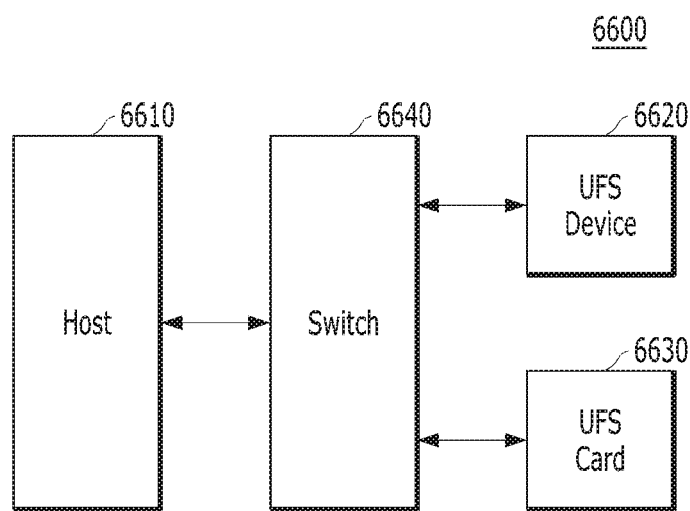

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been illustrated and described by way of example. However, a plurality of UFS devices and UFS cards may be connected in parallel or in the form of a star to the switching module 6640, and a plurality of UFS cards may be connected in series or in the form of a chain to the UFS device 6620.

Figure 15:
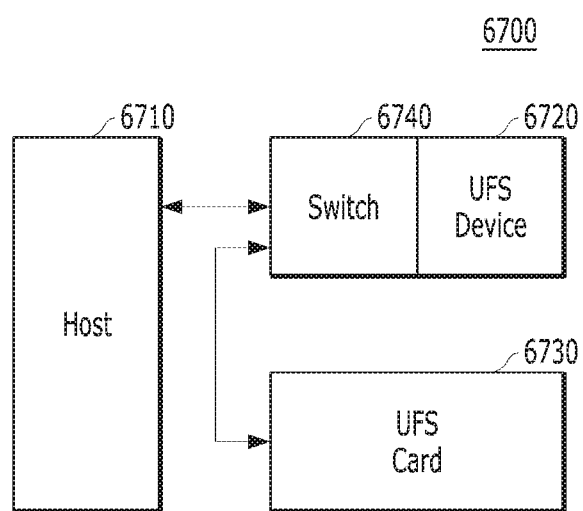

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been illustrated and described by way of example. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
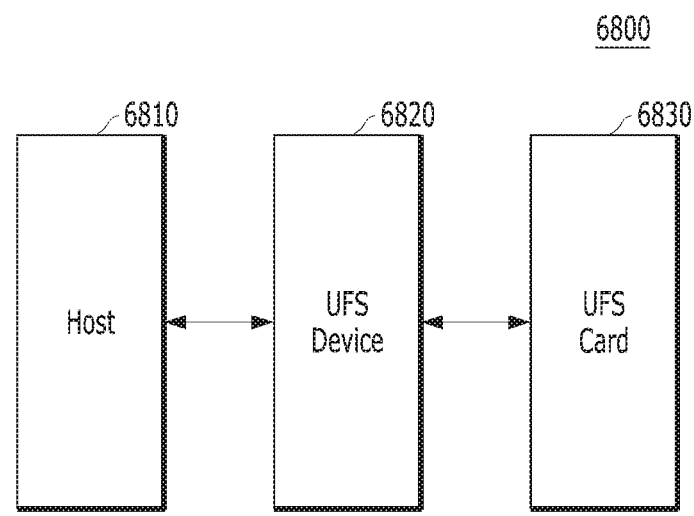

In the UFS system 6800 illustrated in FIG. 16, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been illustrated and described by way of example. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 17:
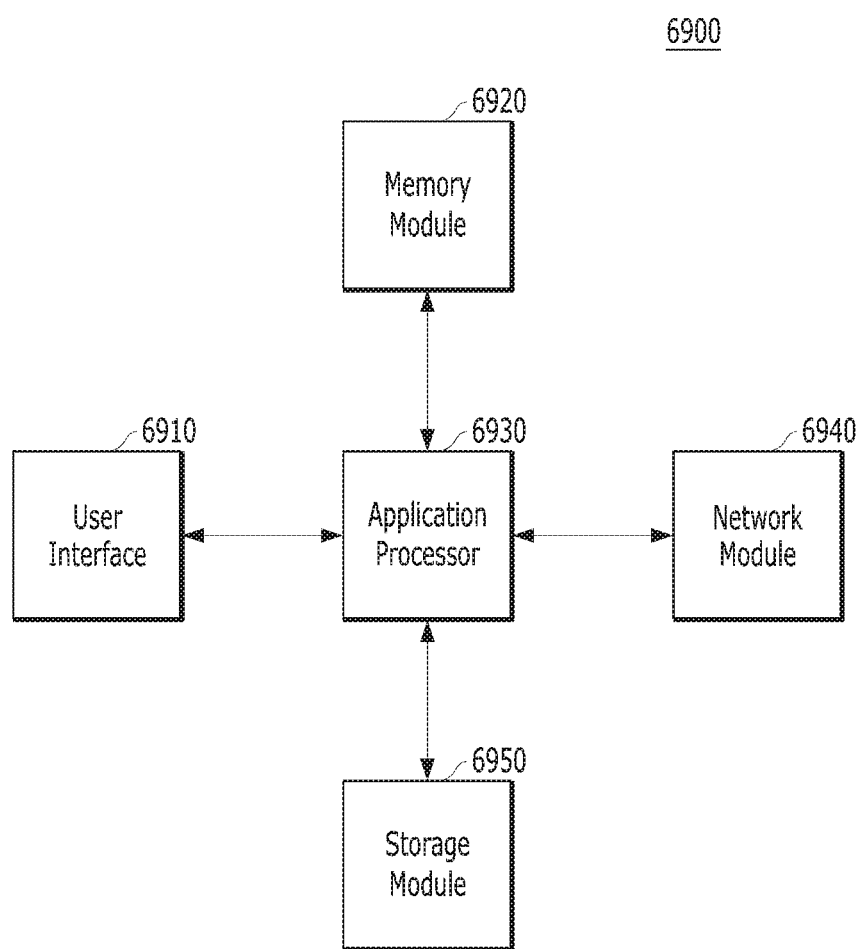

FIG. 17 is a diagram schematically illustrating another example of the data processing system including the memory system in accordance with an embodiment. FIG. 17 is a diagram schematically illustrating a user system to which the memory system may be applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIGS. 1 and 7. Furthermore, the storage module 6950 may be embodied as an SSD, an eMMC and an UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 7 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the processor 6930 on a display/touch module of the mobile electronic device. Further, the user interface 6910 may support a function of receiving data from the touch panel.

In embodiments of the present invention, when the memory system controls a plurality of memory blocks, in a memory device by grouping them into a super memory block, a super memory block in which at least one bad memory block and mostly good or stable memory blocks are mixed and grouped may be managed to enhance system efficiency. The use of the super memory block in which at least one bad memory block and good memory blocks are mixed and grouped is limited to a target super block in a merge operation.

As a consequence, the storage space of a memory system may be efficiently used, and through this, the sustain period of the memory system may be significantly increased.

Although various embodiments have been described for illustrative purposes, it will be apparent to those skilled in the art that various changes and modifications may be made. The present invention encompasses all such changes and modifications that fall within the spirit and scope of the invention as defined in the following claims.

What is claimed is:

1. A memory system comprising:
   a memory device including a plurality of dies, each including a plurality planes, each including a plurality of blocks; and
   a controller suitable for grouping the plurality of memory blocks into a plurality of super blocks, each of which has a designated type corresponding to a condition,
   wherein the controller forms a set of first super blocks, among the plurality of super blocks, each of which has at least one bad memory block and good memory blocks, and manages the first super blocks,
   wherein the controller forms a set of second super blocks, among the plurality of super blocks, each of which has only good memory blocks, and manages the second super blocks.

2. The memory system according to claim 1, wherein the controller uses the first super blocks as target super blocks in a merge operation.

3. The memory system according to claim 2, wherein the controller manages the first super blocks to be used as target super blocks in the merge operation using a target list corresponding to a use sequence, and
   wherein the use sequence of the target list is determined based on respective priorities of the super blocks.

4. The memory system according to claim 3, wherein the controller sets a first super block having a relatively low erase-write cycle value, among the first super blocks, to a first priority, sets a first super block having a relatively high erase-write cycle value, among the first super blocks, to a second priority lower than the first priority, sets a second super block having a relatively low erase-write cycle value, among the second super blocks, to a third priority lower than the second priority, sets a second super block having a relatively high erase-write cycle value, among the second super blocks, to a fourth priority lower than the third priority, and uses the prioritized super blocks in the use sequence in order of priority.

5. The memory system according to claim 4, wherein the controller manages states of memory blocks in each of the first super blocks using a state bitmap.

6. The memory system according to claim 5, wherein, in the case where the target super blocks are selected from among the first super blocks according to the use sequence of the target list in the merge operation, the controller stores valid data transferred from a source super block only in good memory blocks of the target super blocks by checking the state bitmap which identifies good memory blocks.

7. The memory system according to claim 6,
   wherein the controller manages first super blocks which enter into a closed state as they are used as target super blocks in the merge operation and valid data transferred from a source super block are stored therein by classifying them as third super blocks, and
   wherein, in the case of selecting the third super blocks as source super blocks in the merge operation, the controller first uses the second super blocks as target super blocks according to the use sequence of the target list, and then, manages the third super blocks which enter into a free state as they are used as the source super blocks in the merge operation by classifying them as the first super blocks again.

8. The memory system according to claim 2, wherein, in the case where a bad memory block is in a certain second super block among the second super blocks, the controller moves valid data stored in the certain second super block, to a target super block, through the merge operation, and then, manages the certain second super block as a first super block.

9. The memory system according to claim 1,
   wherein a first die of the plurality of dies is coupled to a first channel,
   wherein a second die of the plurality of dies is coupled to a second channel,
   wherein the plurality of planes in the first die are coupled to a plurality of first ways which share the first channel, and
   wherein the plurality of planes in the second die are coupled to a plurality of second ways which share the second channel.

10. The memory system according to claim 9,
    wherein the controller groups a first block in a first plane of the first die and a second block in a second plane of the first die and groups a third block in a third plane of the second die and a fourth block in a fourth plane of the second die in accordance with the condition,
    wherein the controller groups a first block in a first plane of the first die and a third block in a third plane of the second die and groups a second block in a second plane of the first die and a fourth block in a fourth plane of the second die in accordance with the condition, or
    wherein the controller groups a first block in a first plane of the first die, a second block in a second plane of the first die, a third block in a third plane of the second die and a fourth block in a fourth plane of the second die in accordance with the condition.

11. A method for operating a memory system including a memory device including a plurality of dies, each including a plurality planes, each including a plurality of blocks, the method comprising:
    grouping the plurality of memory blocks into a plurality of super blocks, each of which has a designated type corresponding to a condition;
    forming a set of first super blocks, among the plurality of super blocks, each of which has at least one bad memory block and good memory blocks, and managing the first super blocks; and
    forming a set of second super blocks, among the plurality of super blocks, each of which has only good memory blocks, and manages the second super blocks.

12. The method according to claim 11, further comprising:
    using the first super blocks as target super blocks in a merge operation.

13. The method according to claim 12, further comprising:
    managing the super blocks to be used as target super blocks in the merge operation using a target list corresponding to a use sequence; and
    determining the use sequence of the target list based on respective priorities of the super blocks.

14. The method according to claim 13, wherein the determining sets a first super block having a relatively low erase-write cycle value, among the first super blocks, to a first priority, sets a first super block having a relatively high erase-write cycle value, among the first super blocks, to a second priority lower than the first priority, sets a second super block having a relatively low erase-write cycle value, among the second super blocks, to a third priority lower than the second priority, sets a second super block having a relatively high erase-write cycle value, among the second super blocks, to a fourth priority lower than the third priority, and uses the prioritized super blocks in the use sequence in order of priority.

15. The method according to claim 14, further comprising:
managing states of memory blocks in each of the first super blocks using a state bitmap.

16. The method according to claim 15, wherein, in the case where the target super blocks are selected from among the first super blocks according to the use sequence of the target list in the merge operation, the first use act stores valid data transferred from a source super block only in good memory blocks of the target super blocks by checking the state bitmap which identifies good memory blocks.

17. The method according to claim 16, further comprising:
managing first super blocks which enter into a closed state as they are used as target super blocks in the merge operation and valid data transferred from a source super block are stored therein by classifying them as third super blocks;
using, in the case of selecting the third super blocks as source super blocks in the merge operation, the second super blocks as target super blocks according to the use sequence of the target list; and
managing the third super blocks which enter into an open state as they are used as the source super blocks by classifying them as the first super blocks again.

18. The method according to claim 12, further comprising:
moving, in the case where a bad memory block is in a certain second super block among the second super blocks, valid data stored in the certain second super block, to a target super block, through the merge operation, and then, managing the certain second super block by classifying it as a first super block.

19. The method according to claim 11,
wherein a first die of the plurality of dies is coupled to a first channel,
wherein a second die of the plurality of dies is coupled to a second channel,
wherein the plurality of planes in the first die are coupled to a plurality of first ways which share the first channel, and
wherein the plurality of planes in the second die are coupled to a plurality of second ways which share the second channel.

20. The method according to claim 19,
wherein the condition includes grouping a first block in a first plane of the first die and a second block in a second plane of the first die and grouping a third block in a third plane of the second die and a fourth block in a fourth plane of the second die;
wherein the condition includes grouping a first block in a first plane of the first die and a third block in a third plane of the second die and grouping a second block in a second plane of the first die and a fourth block in a fourth plane of the second die; or
wherein the controller includes grouping a first block in a first plane of the first die, a second block in a second plane of the first die, a third block in a third plane of the second die and a fourth block in a fourth plane of the second die.

* * * * *